United States Patent
Hsu et al.

(10) Patent No.: US 6,580,287 B2
(45) Date of Patent: Jun. 17, 2003

(54) VOLTAGE-BOOSTING GENERATOR FOR REDUCING EFFECTS DUE TO OPERATING VOLTAGE VARIATION AND TEMPERATURE CHANGE

(75) Inventors: Hsien-Wen Hsu, Taipei Hsien (TW); Yu-Shen Lin, Taipei Hsien (TW); Chun-Hsiung Hung, Hsinchu (TW); Ho-Chun Liou, Hsinchu (TW)

(73) Assignee: Macronix International Co., Ltd., Hsinchu (TW)

( * ) Notice: Subject to any disclaimer, the term of this patent is extended or adjusted under 35 U.S.C. 154(b) by 0 days.

(21) Appl. No.: 10/099,806

(22) Filed: Mar. 13, 2002

(65) Prior Publication Data

US 2003/0057995 A1 Mar. 27, 2003

(30) Foreign Application Priority Data

Sep. 24, 2001 (TW) ........................................ 90123430 A

(51) Int. Cl.[7] ............................................. H03K 19/003
(52) U.S. Cl. ............................ 326/32; 326/33; 327/276
(58) Field of Search ...................... 326/31–34; 327/276, 327/277, 281, 536, 537; 363/59–60

(56) References Cited

U.S. PATENT DOCUMENTS

| 5,191,232 A | * | 3/1993 | Wang .......................... 327/306 |
| 5,650,671 A | * | 7/1997 | Pascucci et al. ............. 307/110 |
| 6,430,067 B1 | * | 8/2002 | Lee ............................... 363/60 |

FOREIGN PATENT DOCUMENTS

JP        63185054 A  *  7/1988  ........... H01L/27/04

* cited by examiner

*Primary Examiner*—Michael Tokar
*Assistant Examiner*—James H Cho
(74) *Attorney, Agent, or Firm*—J. C. Patents

(57) ABSTRACT

A voltage-boosting generator for reducing the effects due to operating voltage variation and temperature change. The generator comprises a delay line circuit and a voltage boosting circuit. The delay line circuit is used to perform a time delay according to an initial boosting signal and to produce a control signal. The voltage boosting circuit is used to boosted voltage according to the control signal.

25 Claims, 16 Drawing Sheets

US 6,580,287 B2

VOLTAGE-BOOSTING GENERATOR FOR REDUCING EFFECTS DUE TO OPERATING VOLTAGE VARIATION AND TEMPERATURE CHANGE

CROSS-REFERENCE TO RELATED APPLICATION

This application claims the priority benefit of Taiwan application serial no. 90123430, filed Sep. 24, 2001.

BACKGROUND OF THE INVENTION

1. Field of Invention

The present invention relates to a voltage-boosting generator. More particularly, the present invention relates to a voltage-boosting generator for reducing the effects due to operating voltage variation and temperature change.

2. Description of Related Art

Due to rapid progress in semiconductor manufacturing technologies, the number of transistors in each die is forever increasing. Consequently, stability of circuit during operation must be considered. For example, the voltage-boosting generator for providing suitable operating voltage to the circuit must consider factors such variation of operating voltage, temperature effects and so on.

FIG. 1 is a circuit diagram of a conventional voltage boosting circuit. When the voltage-boosting generator 100 is not in an operating mode, the gate terminal of the NMOS transistor 102 receives a 'H' (high level) RESET signal. Hence, the NMOS transistor 102 is conductive. Potential at one terminal (Vx) of the boosting capacitor Cx 104 is 0V and the potential at the other terminal (Vo) of the boosting capacitor Cx 104 is at the boosting voltage Vup. When the voltage-boosting generator 100 starts to work, gate terminal of the NMOS transistor 102 receives a 'L' (low level) RESET signal. Hence, the NMOS transistor 102 shuts down and the control signals C0, C1, C2 all become 'L' so that PMOS transistors 106~114 all become conductive and charge up the boosting capacitor Cx 104. As soon as potential Vx at one terminal of the boosting capacitor Cx 104 is charged to VDD, potential Vo at the other terminal of the boosting capacitor Cx 104 is at Vup+VDD×Cx/(Cx+Cy) where Cy 116 is a parasitic capacitance. Potential Vo is the required boosted voltage level.

As shown in FIG. 1, all the PMOS transistors 106~114 become conductive simultaneously. However, the PMOS transistors 106~114 shut at slightly different times. FIG. 2A is graph showing the operating curve of a conventional voltage-boosting generator. As shown in FIG. 2A, when the PMOS transistors 106~114 all conduct at the same time, potential at terminal Vo is charged from a voltage V1 to a voltage V2 and a voltage detection circuit (not shown) will detect the voltage V2 at the terminal Vo. At this moment, the control signal C0 changes from a 'L' to a 'H'. The PMOS transistors 106~108 are shut down and charging current feeding the boosting capacitor Cx 104 is reduced. Hence, charging rate from voltage V2 onwards is reduced.

As the terminal Vo charges up from the voltage V2 to a voltage V3, a voltage detection circuit (not shown) will detect the voltage V3 at the terminal Vo. At this moment, the control signal C1 changes from a 'L' to a 'H'. The PMOS transistors 109~111 are shut down and charging current feeding the boosting capacitor Cx 104 is further reduced. Hence, charging rate from voltage V3 onwards is further reduced.

As the terminal Vo charges up from the voltage V3 to a voltage V4, a voltage detection circuit (not shown) will detect the voltage V4 at the terminal Vo. At this moment, the control signal C2 changes from a 'L' to a 'H'. The PMOS transistors 112~114 are shut and the charging of the boosting capacitor Cx 104 is stopped. Hence, charging rate from voltage V4 onwards is zero.

When the voltage detection circuit (not shown) detects terminal Vo reaching the required boosting level, all PMOS transistors 106~114 shut down and the boosting capacitor is no longer charged. However, if there is a change in the operating voltage or the temperature of the die, voltage detected by the voltage detecting circuit may also change. Due to changes in the operating voltage or die temperature, the reference value inside the voltage detecting circuit (not shown) for conducting a comparison may change so much that the boosted voltage generated by the voltage-boosting generator no longer is the required value.

In addition, assume the operating voltage of the die is 2.6V~3.7V and the operating temperature of the die is −40° C.~85° C. FIG. 2B is a graph showing the operating curves of a conventional voltage-boosting generator working at temperatures −40° C. and 85° C. respectively. When the die is operating at −40° C., the voltage-boosting generator has a higher charging rate. On the other hand, when the die is operating at 85° C., the voltage-boosting generator has a lower charging rate. FIG. 2C is a graph showing the operating curves of a conventional voltage-boosting generator working at voltage 2.6V and 3.7V respectively. Similarly, when a die operates at 3.7V, the voltage-boosting generator has a higher charging rate. When the die operates at 2.6V, the voltage-boosting generator has a lower charging rate. A higher charging rate for the voltage-boosting generator implies a higher charging current and a shorter charging time. On the contrary, a smaller charging output from the voltage-boosting generator results in a longer charging period. Hence, if the die is operating at a temperature of 85° C. and an operating voltage of 2.6V, boosting capacity provided by the voltage-boosting generator is the worst (such as small charging current, long charging period and a charging voltage outside the desired range). Therefore, the ultimate difference in voltage shown in FIGS. 2B and 2C is due to the voltage detection circuit for the reasons described above.

SUMMARY OF THE INVENTION

Accordingly, one object of the present invention is to provide a voltage-boosting generator capable of reducing operating voltage and temperature effect. As the operating voltage and temperature of a die changes, the voltage-boosting generator has an automatic mechanism for adjusting the charging time and the number of conductive voltage-driving MOS transistors so that the effects produced by the change in operating voltage and temperature are balanced. Ultimately, the voltage-boosting generator is able to provide a voltage level at the desired value. In addition, the voltage-boosting generator can still operate at ideal operating conditions even if the die is working at a low corner operating condition because charging current and charging time of the voltage-boosting generator are adjustable.

To achieve these and other advantages and in accordance with the purpose of the invention, as embodied and broadly described herein, the invention provides a voltage-boosting generator for reducing the operating voltage effect and the temperature effect. The voltage-boosting generator includes a delay line circuit and a voltage boosting circuit. The delay line circuit is used to perform a time delay according to an initial boosting signal and to produce a control signal. The voltage boosting circuit is used to boosted voltage according to the control signal. Hence, when the operating voltage or the temperature of a die changes, the effects due to the changes in operating voltage or the temperature are minimized. In addition, the voltage-boosting generator can still provide ideal operating characteristics even if the die operates at the lower corner condition.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
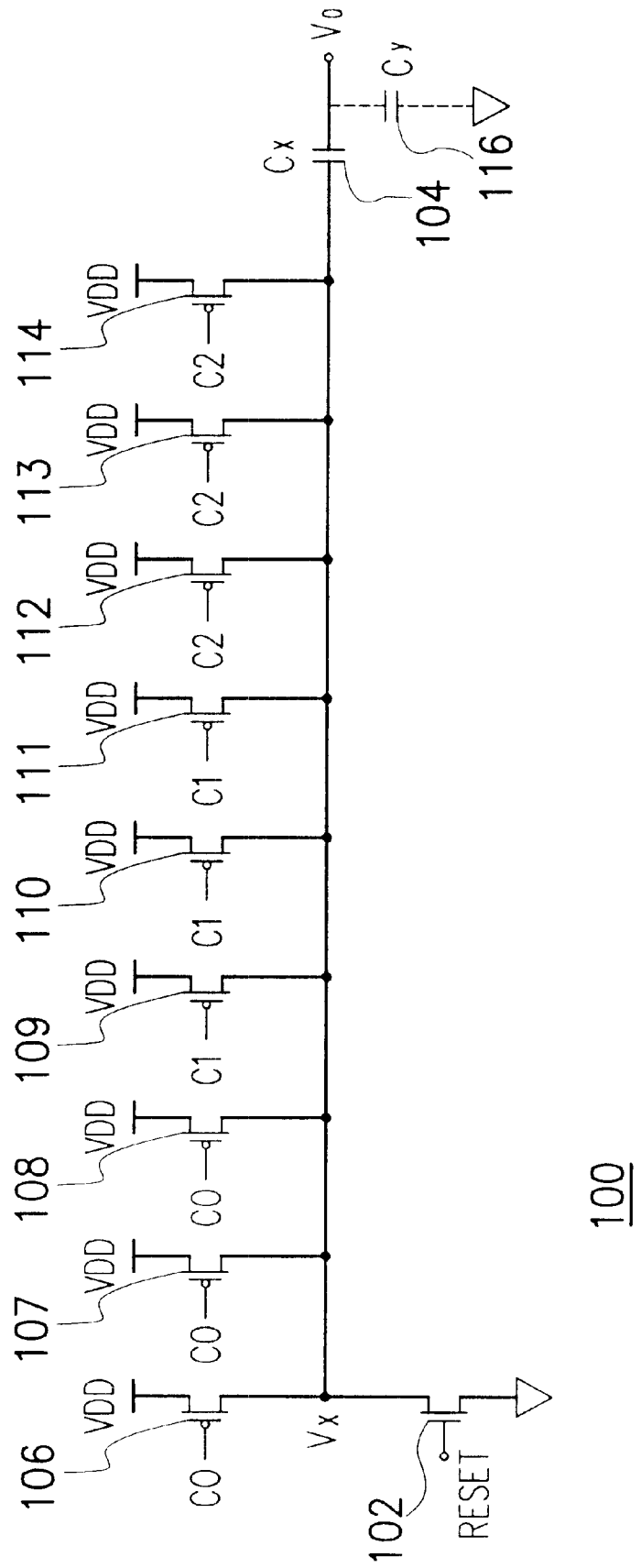
FIG. 1 is a circuit diagram of a conventional voltage boosting circuit.
Figure 2A:
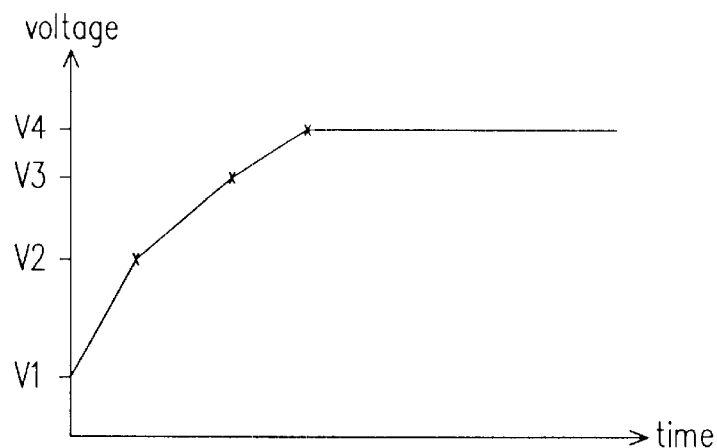
FIG. 2A is graph showing the operating curve of a conventional voltage-boosting generator.
Figure 2B:
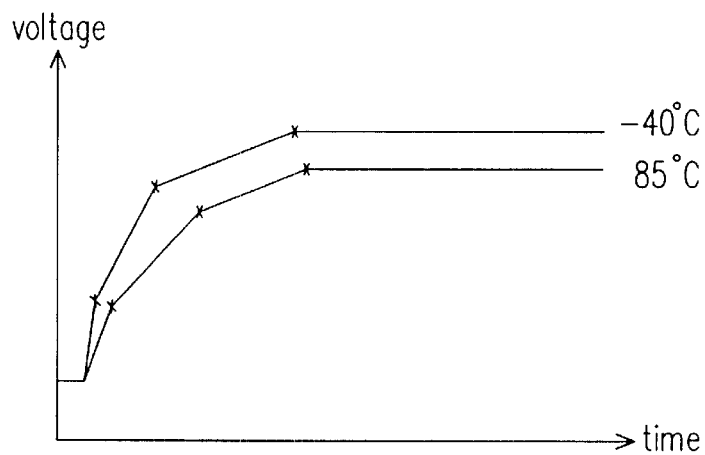
FIG. 2B is a graph showing the operating curves of a conventional voltage-boosting generator working at temperatures −40° C. and 85° C. respectively.
Figure 2C:
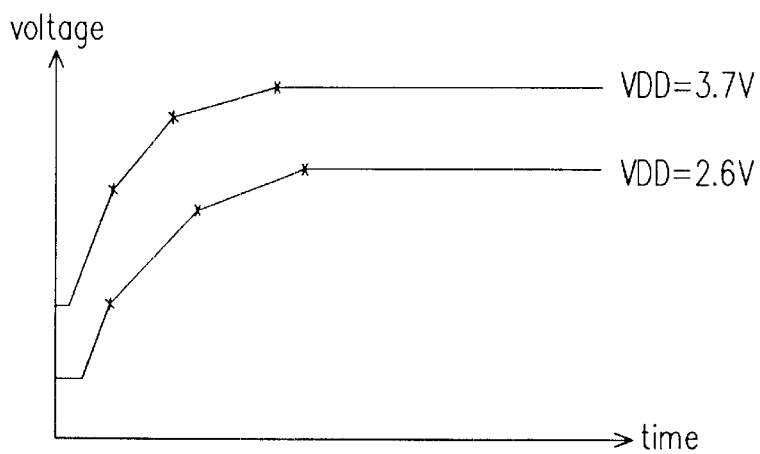
FIG. 2C is a graph showing the operating curves of a conventional voltage-boosting generator working at voltage 2.6V and 3.7V respectively.

Reference will now be made in detail to the present preferred embodiments of the invention, examples of which are illustrated in the accompanying drawings. Wherever possible, the same reference numbers are used in the drawings and the description to refer to the same or like parts.

Figure 3:
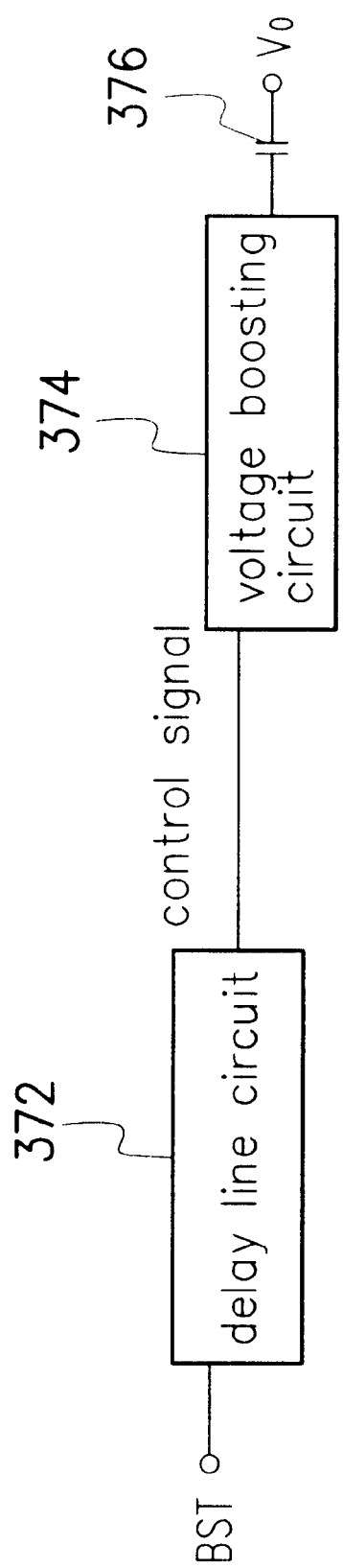
FIG. 3 is a block diagram of a voltage boosting generator according to a preferred embodiment of the present invention.

FIG. 3 is a block diagram of a voltage-boosting generator according to a preferred embodiment of this invention. As shown in FIG. 3, a delay line circuit 372 inside a voltage-boosting generator 370 receives a initial boosting (BST) signal. After a period of delay, the delay line circuit 372 transmits out a control signal to a voltage-boosting circuit 374 in order to charge a capacitor 376. After the capacitor 376 is charged by the voltage-boosting circuit 374, an output voltage Vo is risen to a voltage value that is required for the operation.

Figure 4:
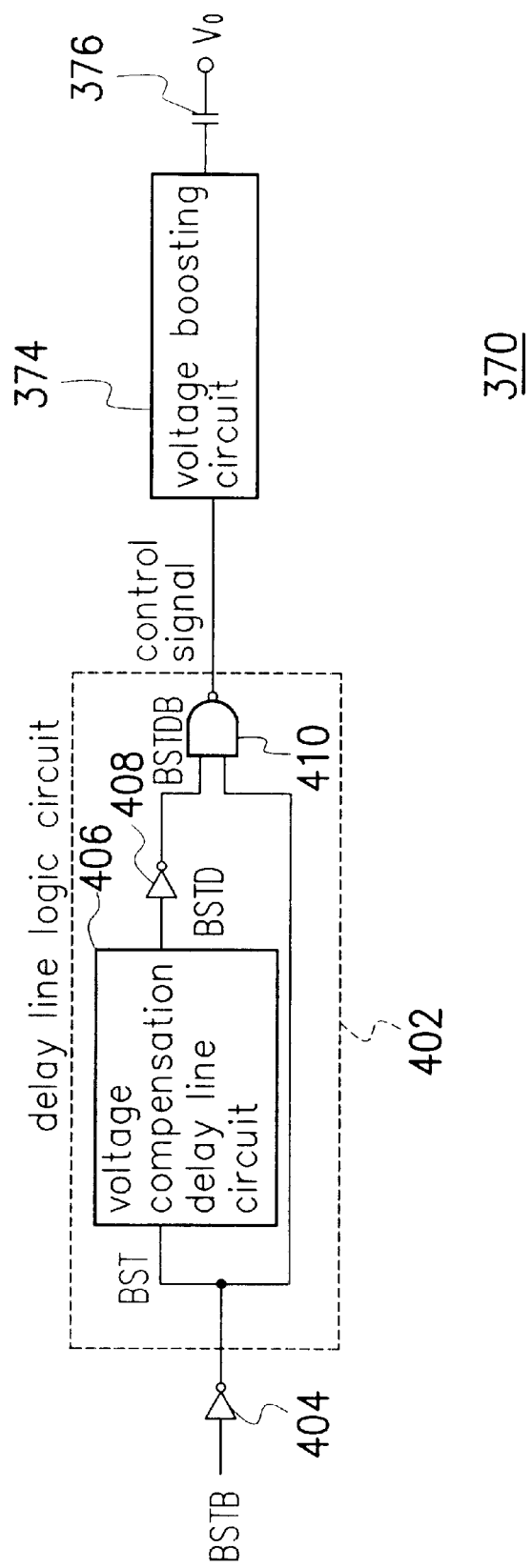
FIG. 4 is a block circuit diagram of a voltage boosting generator consists of voltage compensation according to one preferred embodiment of the present invention.

The voltage-boosting circuit 374 can be integrated by a plurality of metal oxide semiconductors (MOS) (shown in FIG. 1). The voltage-boosting circuit 374 further comprises a reset MOS (as NMOS 102 shown in FIG. 1). The reset MOS (NMOS 102 in FIG. 1) resets the output voltage from the voltage-boosting circuit 374 according to the initial-boosting (BST) signal. The delay line circuit 372 can be used for compensating the operation voltage or the temperature. In FIG. 4, a block circuit diagram of a voltage-boosting generator consists of voltage compensation according to one preferred embodiment of the present invention. A delay line logic circuit 402 comprises a voltage compensation delay line circuit 406, an inverter 408 and a NAND gate 410. The inverter 408 is used to invert an inverted initial-boosting (BSTB) signal. The inverter 408 transmits out a BST signal to the voltage compensation delay line circuit 406 and the NAND gate 410. The voltage compensation delay line circuit 406 receives the BST signal and performs a time delay for the BST signal so that a delay initial-boosting (BSTD) signal is transmitted to the inverter 408. Meanwhile, the inverter 408 inverts the BSTD signal and then transmits a delay BSTDB signal from the inverter 408 to the NAND gate 410. The NAND gate 410 performs its NAND operation according to the BST signal and the delay BSTDB signal in order to produce a control signal to the voltage-boosting circuit 374.

Figure 5:
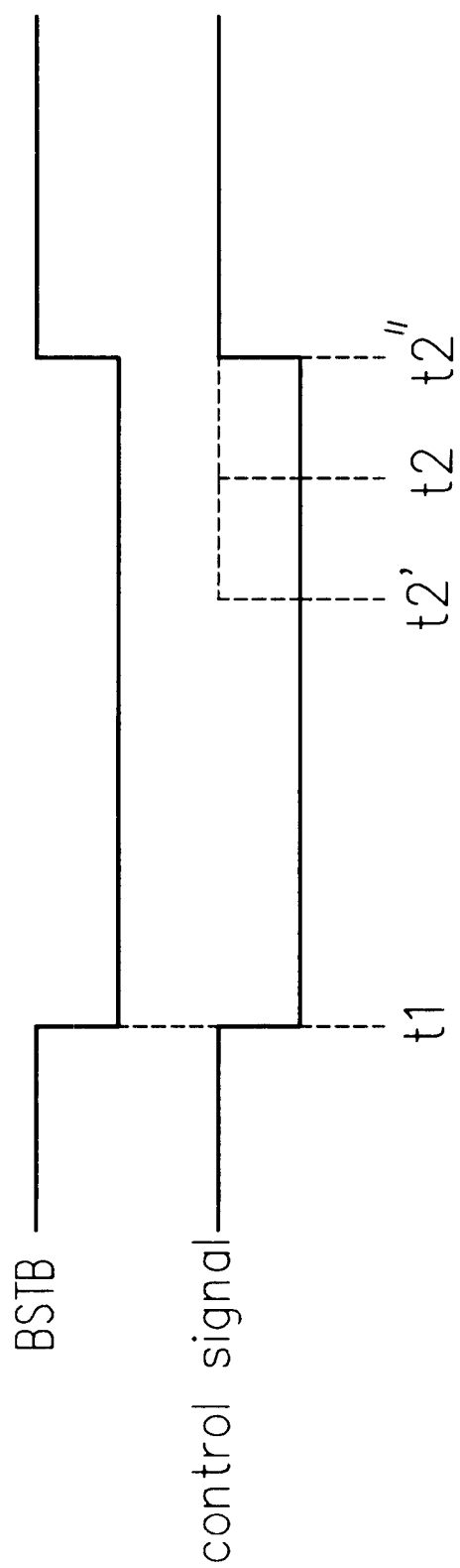
FIG. 5 shows a timing diagram of control signals of the circuit shown in FIG. 4.

FIG. 5 shows a timing diagram of control signals of the circuit shown in FIG. 4. Referring to FIGS. 5 and 4, when the inverted initial-boosting BSTB signal changes from 'H' to 'L' at a time point t1, the delay line logic circuit 402 changes a control signal that is transmitted out from 'H' to 'L' at the time point t1 and the capacitor 376 is charged by the voltage-boosting circuit 374. When the voltage Vo reaches the operating voltage, the delay line logic circuit 402 changes the control signal from 'L' to 'H' at a time point t2. If operating voltage of the voltage-boosting generator 370 is changed, the voltage compensation delay circuit 406 will do the compensation of the operating voltage. Further, because the operating voltage changes, the control signals may changes from 'L' to 'H' at the time point t2' or t2".

Figure 6:
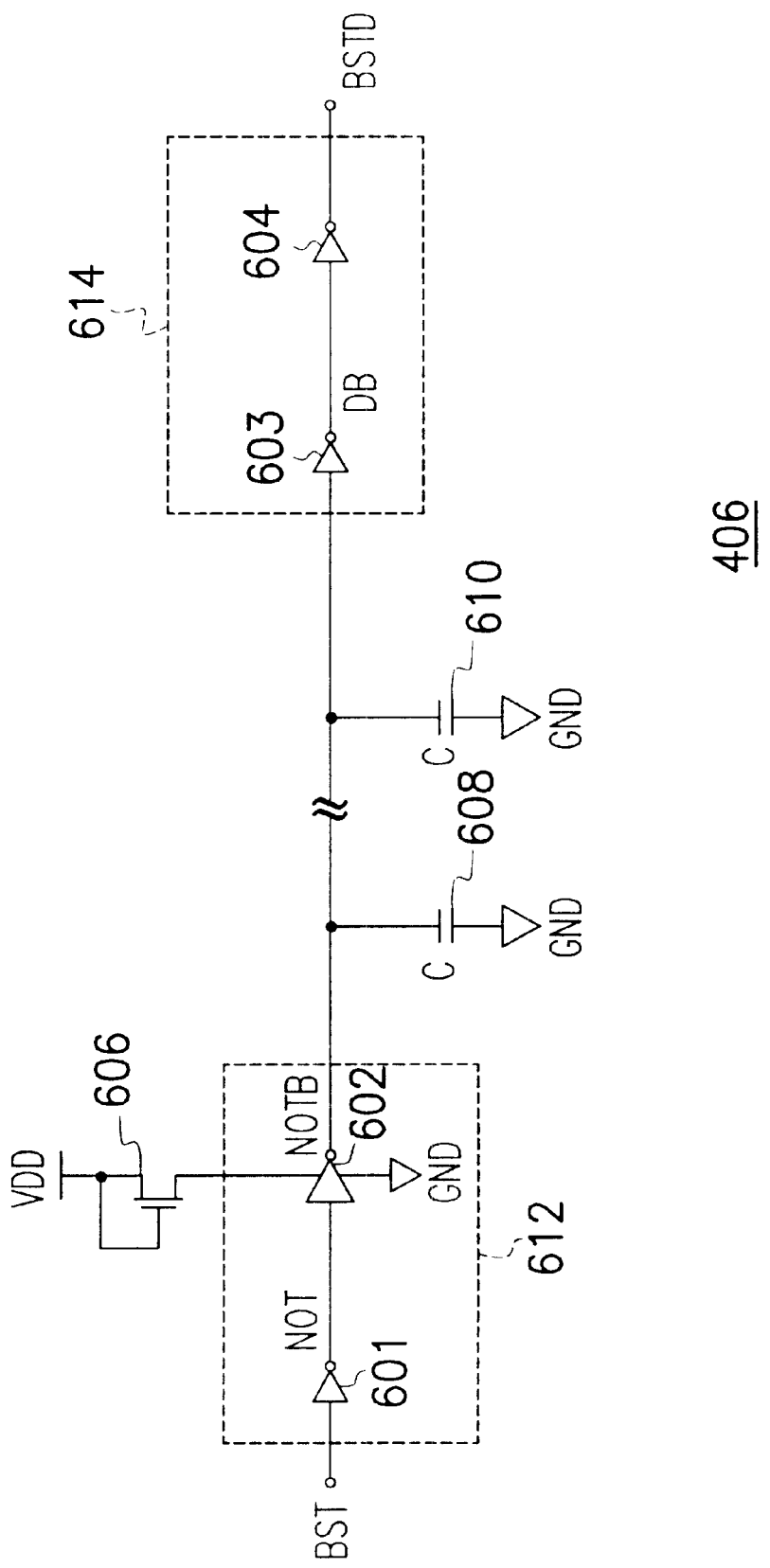
FIG. 6 is a circuit diagram showing a voltage compensation delay line circuit inside a voltage-boosting generator according to one preferred embodiment of the present invention.

The circuit diagram of the voltage compensation delay circuit of FIG. 4, which is shown in FIG. 6 is the voltage compensation delay circuit inside the voltage-boosting generator according to a preferred embodiment of the present invention. In FIG. 6, an input of an inverter 601 inside an inverter module 612 receives the initial-boosting signal BST, an inverting signal NOT is transmitted out from an output of the inverter 601. A source terminal of a switch NMOS 606 (PMOS can also be used) is coupled to an operating voltage VDD. A control terminal of the switch NMOS 606 is coupled to the source terminal of the switch NMOS 606, thus, the switch NMOS 606 controls a saturation region. A source terminal inverter 601 of the inverter module 612 is coupled to a negative terminal of the switch NMOS 606 and a ground terminal of the inverter 602 is coupled to the ground. An input of an inverter 602 receives an inverting signal NOT from the inverter 601 and an output of the inverter 602 transmits out an inverting signal NOTB. An input of an inverter 603 inside an inverter module 614 receives an inverting signal NOTB from the inverter module 612, and an output of the inverter 603 transmits out an inverting signal DB. An input of an inverter 604 inside an inverter module 614 receives the inverting signal DB from the inverter 603 and an output of the inverter 604 transmits out a delay initial boosting signal BSTD. A plurality of first terminals of the capacitors 608 and 610 are coupled in between the output of the inverter 602 and the input of the inverter 603. Second terminals of the capacitors 608 and 610 are coupled to the ground.

Referring to FIG. 6, the MOS can be used by the capacitor C to complete the capacitate function. The number of capacitors C is depended on how long is the charging time of the voltage compensation delay line circuit 406. If the charging time is longer, the number of the capacitors required will be increased. In the contrary, if the charging time is shorter, the number of the capacitors required will be less. The inverters 601–604 can be used as isolation to prevent the external signals entering and interfering a charging circuit of the capacitors C 608, C610 during the charging time. Otherwise, the current flow and the charging time of the charging/discharging current of the capacitor C608 and 610 will be affected. Further, the delay time of the voltage compensation delay line circuit 406 will also be affected. Since the operating voltage is VDD, because the capacitors C 608 and C610 are charged by the inverter 602, therefore, the operating voltage of the inverter 602 is VDD. Thus, when the operating voltage VDD changes, the current flow and the charging time of the charging/discharging current of the capacitors C608 and C610 will be changed. The voltage compensation delay line circuit 406 can alter the charging time of the voltage boosting circuit 374 (shown in FIG. 3) charges at the capacitor 376 (FIG. 3) by adjusting the operating voltage VDD. Therefore, an operating efficiency of the voltage-boosting generator 370 can be prevented from affecting by the changes of the operating voltage VDD.

Figure 7:
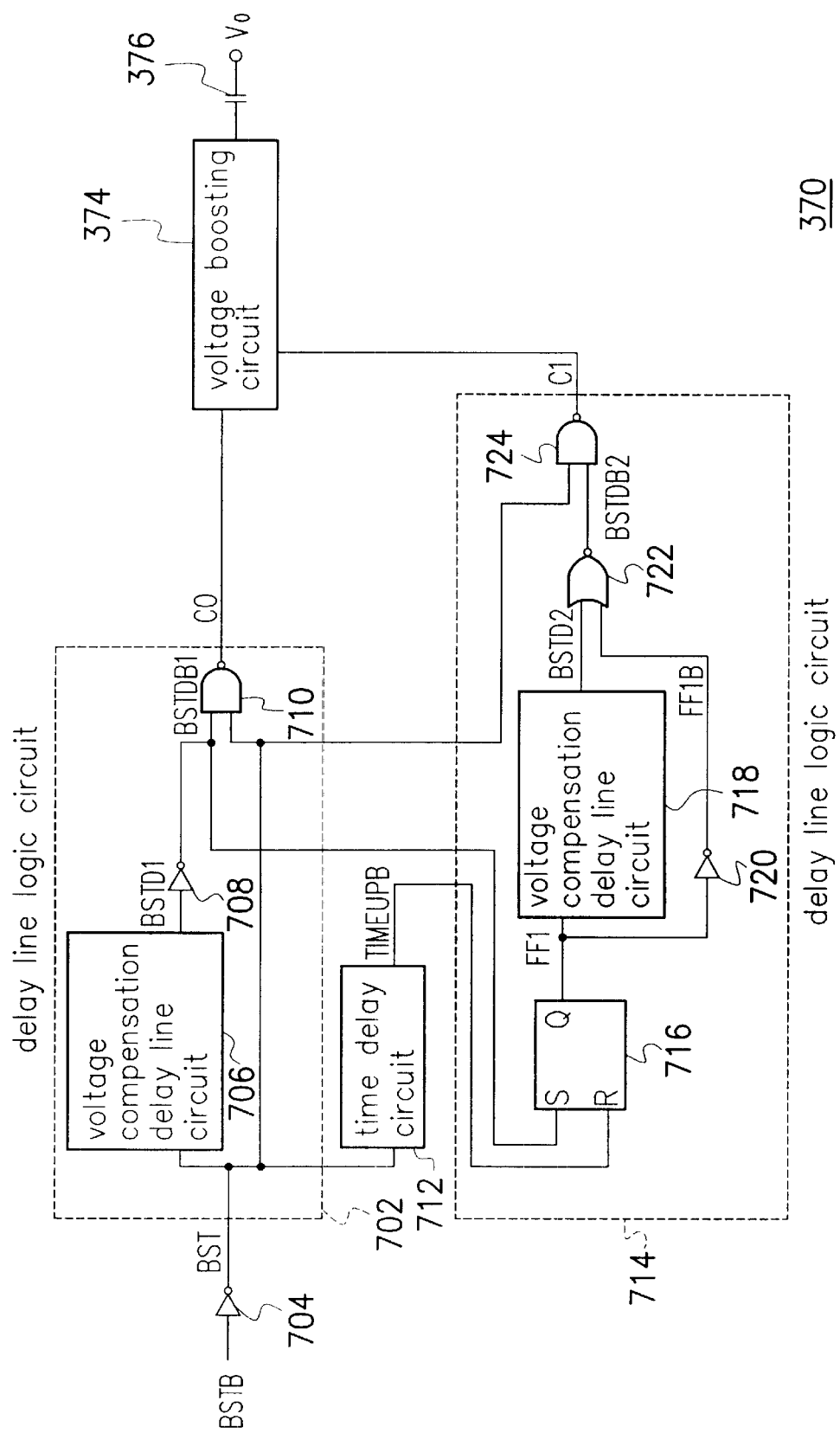
FIG. 7 is another block circuit diagram of a voltage-boosting generator consists voltage compensation.

FIG. 7 shows another block circuit diagram of a voltage-boosting generator consists voltage compensation of the present invention. In FIG. 7, a delay line logic circuit 702 comprises a voltage compensation delay line circuit 706, an inverter 708 and a NAND gate 710. An inverter 704 inverts an inverted initial-boosting signal BSTB and transmits out an initial-boosting signal BST to the voltage compensation delay line circuit 706 and the NAND gate 710. The voltage compensation delay line circuit 706 receives the initial boosting signal BST and performs a time delay with the initial-boosting signal BST. So that, a delay initial-boosting signal BSTD1 is transmitted out from the voltage compensation delay line circuit 706 to the inverter 708. Meanwhile, the inverter 708 inverts the delay initial-boosting signal BSTD1 and transmits out a delay signal BSTDB1 to the NAND gate 710. The NAND gate 710 performs a NAND gate operation according to the initial-boosting signal BST and the delay signal BSTDB1. So that a control signal C0 is transmitted to the voltage-boosting circuit 374.

A time delay circuit 712 performs a time delay for the initial boosting signal BST and transmits an initial-time signal TIMEUPB to a delay line logic circuit 714. The delay line logic circuit 714 comprises a RS flip-flop 716, a voltage compensation delay line circuit 718, an inverter 720, a NOR gate 722 and a NAND gate 724. The RS flip-flop 716 transmits out a signal FF1 to the voltage compensation delay line circuit 718 and the inverter 720 in accordance with statuses of the delay initial-boosting signal BSTD1 transmitted by the delay line logic circuit 702 and the delay initial-boosting signal TIMEUPB transmitted by the time delay circuit 712. The voltage compensation delay line circuit 718 receives the signal FF1 and performs a time delay for the signal FF1 so that a delay initial-boosting signal BSTD2 is transmitted to the NOR gate 722. The inverter 720 inverts the received signal FF1 to produce an inverting signal FF1B to the NOR gate 722. The NOR gate 722 performs a NOR gate operation according to the inverting signal FF1B and the delay signal BSTDB2 to transmit the signal BSTDB2 to the NAND gate 724. The NAND gate 724 performs a NAND gate operation according to the initial-boosting signal BST and the signal BSTDB2 to produce a control signal C1, which is then transmitted to the voltage-boosting circuit 374.

Figure 8:
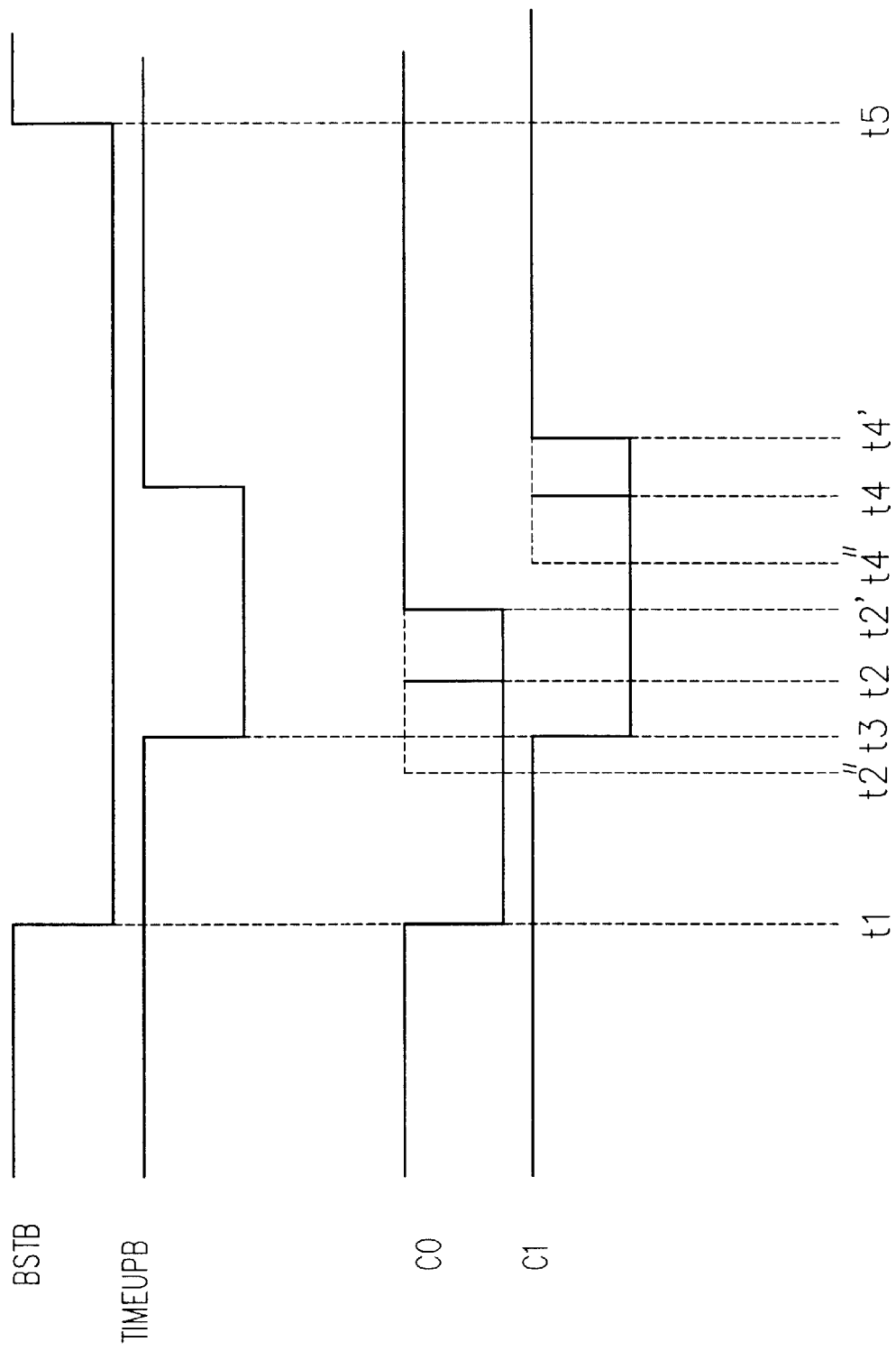
FIG. 8 is a timing diagram of the control signals of the circuit shown in FIG. 7.

FIG. 8 shows a timing diagram of the control signals of the circuit which is shown in FIG. 7. In FIG. 8 (referring to FIG. 7), when the signal BSTB changes from 'H' to 'L' at a time point t1, it indicates that the initial-boosting signal BST changes from 'L' to 'H'. The time delay circuit 712 and the delay line logic circuit 702 start to operate and the delay line logic circuit 702 changes the control signal C0 from 'H' to 'L' at the time point t1. So that the capacitor 376 is charged by the voltage-boosting circuit 374 in order to increase the voltage Vo.

At a time point t3, because the control signal C0 is still at a 'L' status, after a period of delay, the delay line circuit 316 starts to alter the initial-time signal TIMEUPB from 'H' to 'L' and transmits the signal to the delay line logic circuit 714. At this moment, the logic circuit 702 sends the 'H' delay signal BSTDB1 to logic circuit 714, when the delay line logic circuit 714 receives the 'L' initial-time signal TIMEUPB and the 'H' delay signal BSTDB1, the delay line logic circuit 714 starts to operate. At the same time point t3, a control signal C1 is changed from 'H' to 'L' to allow the voltage-boosting circuit 374 to recharge at the capacitor 376. So that, the voltage Vo is risen again.

When voltage-boosting generator 370 increases the voltage to reach a required voltage for the operation, the signal BSTB is changed from 'L' to 'H' at a time point t5. The initial-boosting signal BST is changed from 'H' to 'L'. The time delay circuit 712, the delay line logic circuit 702 and the delay line logic circuit 714 not longer operate, therefore, the control signals C0 and C1 are 'H'.

When the operating voltage of the voltage-boosting generator 370 changes, the voltage compensation delay line circuits 706, 718 will compensate the operating voltage. The control signal C0 may be changed from 'L' to 'H' at time point t2' or t2" and the control signal C1 may be changed from 'L' to 'H' at time point t4' or t4" because of the changes of the operating voltage. At time t2", C1 is unchanged.

The detailed circuit structures of the voltage compensation delay line circuits 706 and 718 in FIG. 7 are the same as the one shown in FIG. 6. The differences between of the voltage compensation delay line circuit 718 and the voltage compensation delay line circuit 706 are the input and output signals. An input signal of the voltage compensation delay line circuit 706 is an initial-boosting signal BST and an output signal is a delay signal BSTDB1. An input signal of the voltage compensation delay line circuit 718 is a signal FF1 and an output signal is a delay signal BSTDB2. Although, the input signal and the output signal of the voltage compensation delay line circuit 706 are different from the voltage compensation delay line circuit 718 (FIG. 7). However, the detailed circuit structures of these two voltage compensation delay line circuits 706 and 718 are the same as the one shown in FIG. 6.

Figure 9:
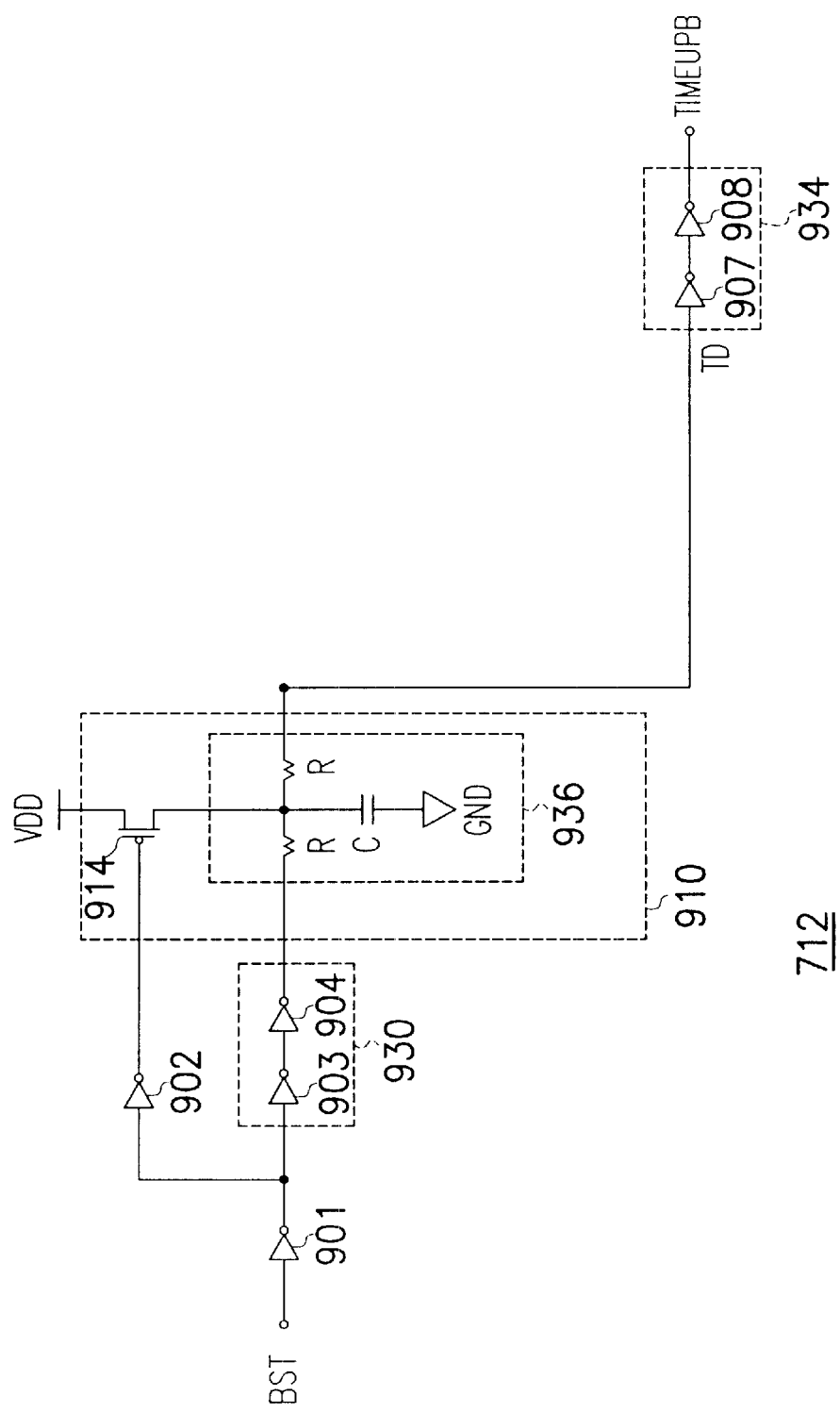
FIG. 9 is a circuit diagram showing a time delay circuit inside a voltage-boosting generator according to a preferred embodiment of the present invention.

FIG. 9 is a circuit diagram showing a time delay circuit inside a voltage-boosting generator according to a preferred embodiment of the present invention. In FIG. 9, an input terminal of an inverter 901 inside the time delay circuit 712 receives an initial-boosting signal BST, and an output of the inverter 901 transmits out a first inverted signal. An input of an inverter 902 receives the first inverted signal from the inverter 901 and transmits a second inverted signal from its output terminal. An input terminal of an inverter 903 inside an inverter module 930 receives the first inverted signal from the inverter 902. A third inverted signal is transmitted out from an output terminal of the inverter 903. An input terminal of an inverter 904 inside the inverter module 930 receives the third inverted signal from the inverter 903. A fourth inverted signal is transmitted out from an output of the inverter 904.

A source terminal of a RC time delay circuit 910 is coupled to the operating voltage VDD. A first signal input terminal of the RC time delay circuit 910 receives the second inverted signal from the inverter 902. A second signal input terminal of the RC time delay circuit 910 receives the fourth inverted signal from the inverter 904. The RC time delay circuit 910 performs a time delay and produces a time delay signal TD, which is then transmitted out by a time delay signal output terminal.

An input terminal of an inverter 907 inside an inverter module 934 receives the time delay signal TD from the RC time delay circuit 910. An output terminal of the inverter 907 transmits out a fifth inverted signal. An input terminal of an inverter 908 inside the inverter module 934 receives the fifth inverted signal from the inverter 907. An initial-time signal TIMEUPB is transmitted out from an output terminal of the inverter 908.

In FIG. 9, according to a charge/discharge duty cycle of the initial time signal TIMEUPB, a plurality of sets of the time delay circuits, which are identical to the RC time delay circuit 910 may be used to adjust the duty cycle. A PMOS transistor 914 (a NMOS transistor may be used) within the RC time delay circuit 910 serves as a switch. A source terminal of the PMOS transistor 914 is coupled to the operating voltage terminal VDD. A control terminal of the PMOS transistor 914 is coupled to the output terminal of the inverter 902. A loading terminal of the PMOS transistor 914 serves as a charging source for a RC circuit 936. The RC circuit 936 delays the fourth inverted signal from the inverter 904 for a period of time before sending out the time delay signal TD to the input terminal of the inverter 907. The circuit structure of the RC circuit 936 can be implemented in many ways, such as the RC circuit 936 shown in FIG. 9 is just one of many circuit types. A capacitor C inside the RC circuit 936 can be implemented by using a MOS transistor. The resistor R of the RC circuit 936 can be implemented by using a low temperature coefficient resistor (such as poly R). Hence, when the RC circuit is charged or discharged, the flowing size of the charging/discharging current and the charging/discharging period are less affected by the temperature changes. Furthermore, reasons for using inverters 903, 904 within the time delay circuit 712 aside from the capacity of charging/discharging the RC circuit to a fixed level-switching voltage in order to perform switching 'H' and 'L' level operation is that the RC circuit is effectively isolated. So that, an external signal is incapable to reach the RC circuit and affect the flowing size of charging/discharging current and charging/discharging period.

Figure 10:
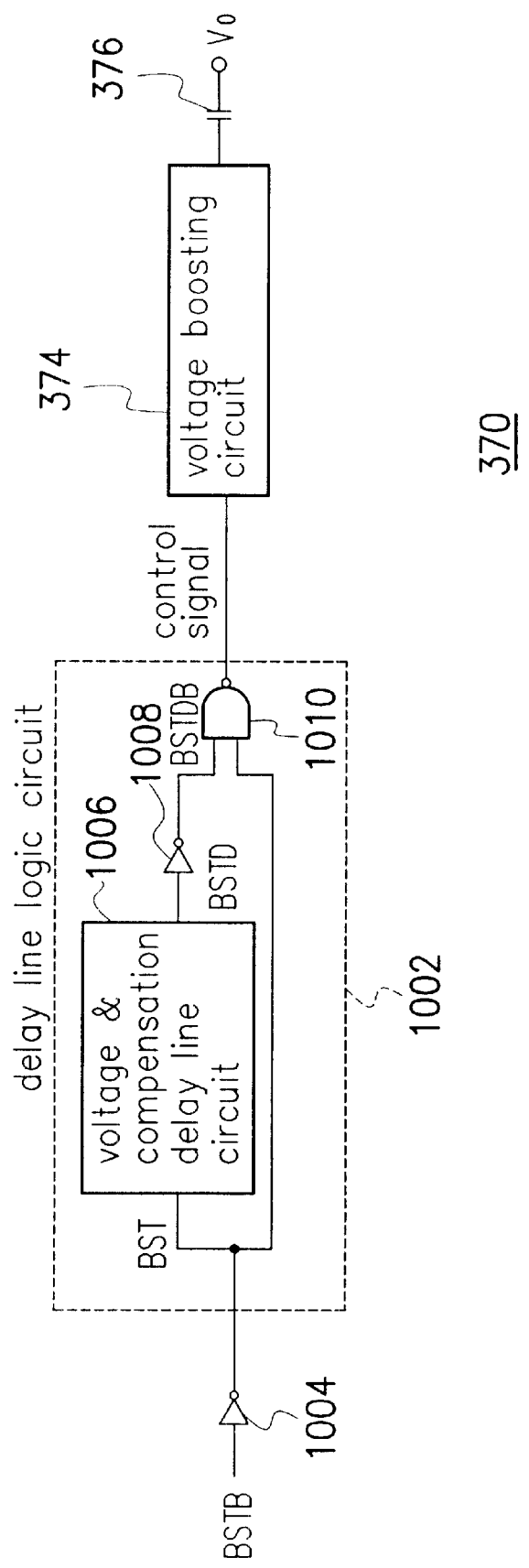
FIG. 10 is a circuit block diagram showing the voltage and temperature compensation of a voltage-boosting generator.

FIG. 10 is a circuit block diagram showing the voltage and temperature compensation of a voltage-boosting generator. In FIG. 10, a delay line logic circuit 1002 comprises a voltage and temperature compensation delay line circuit 1006, an inverter 1008 and a NAND gate 1010. An inverter 1004 transmits an initial-boosting signal BST to the voltage and temperature compensation delay line circuit 1006 and the NAND gate 1010. The voltage and temperature compensation delay line circuit 1006 performs a time delay on the initial-boosting signal BST after receiving the signal BST. A delay initial-boosting signal BSTD is transmitted from the voltage and temperature compensation delay line circuit 1006 to the inverter 1008. Meanwhile, the inverter 1008 inverts the delay initial-boosting signal BSTD and produces a delay signal BSTDB to the NAND gate 1010. The NAND gate 1010 performs a NAND gate operation according to the initial-boosting signal BST and the delay signal BSTDB. A control signal is then transmitted from the NAND gate 1010 to the voltage-boosting circuit 374.

Figure 11:
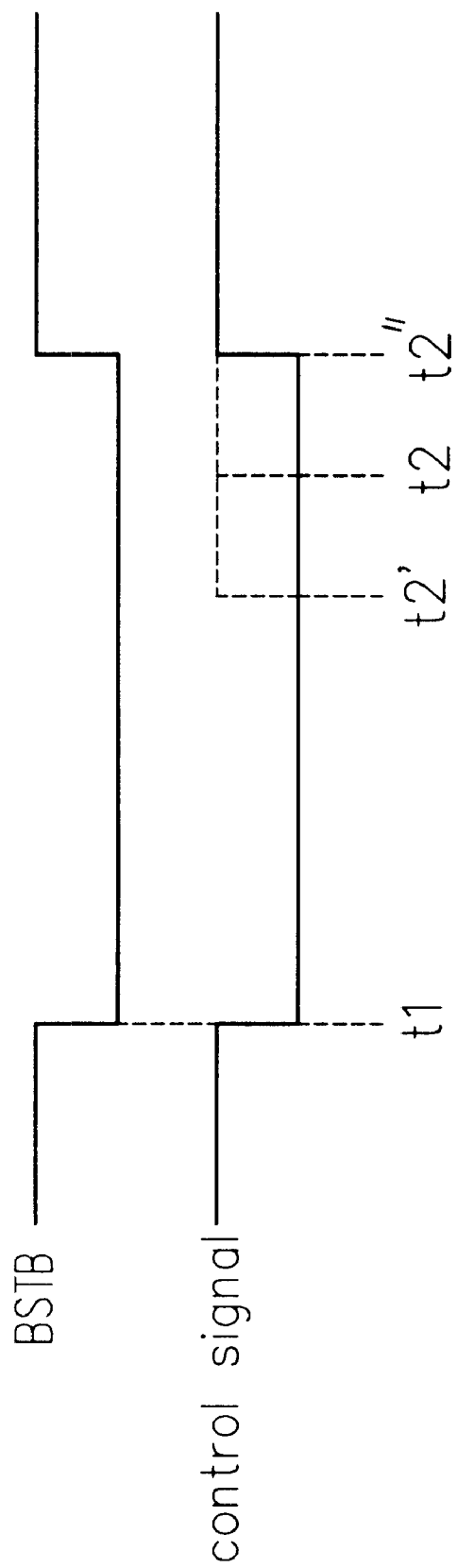
FIG. 11 is a timing diagram of the control signals of the circuit in FIG. 10.

FIG. 11 is a timing diagram of the control signals of the circuit in FIG. 10. In FIG. 11 (referring to FIG. 10 as well), when the inverted initial-boosting signal BSTB is changed from 'H' to 'L' at a time point t1 and the control signal transmitted out from the delay line logic circuit 1002 is changed from 'H' to 'L' at the time point t1, the capacitor 376 will be charged by the voltage-boosting circuit 374. When the voltage Vo is increased to a required voltage for the operation, the delay line logic circuit 1002 will change the control signal from 'L' to 'H'. If the operating voltage and the temperature of the voltage-boosting generator 370 change, the voltage and temperature compensation delay line circuit 1006 will perform compensation for the operating voltage and the temperature. The control signal may be changed from 'L' to 'H' at a time point t2' or t2" due to the changes of the operating voltage and the temperature.

Figure 12:
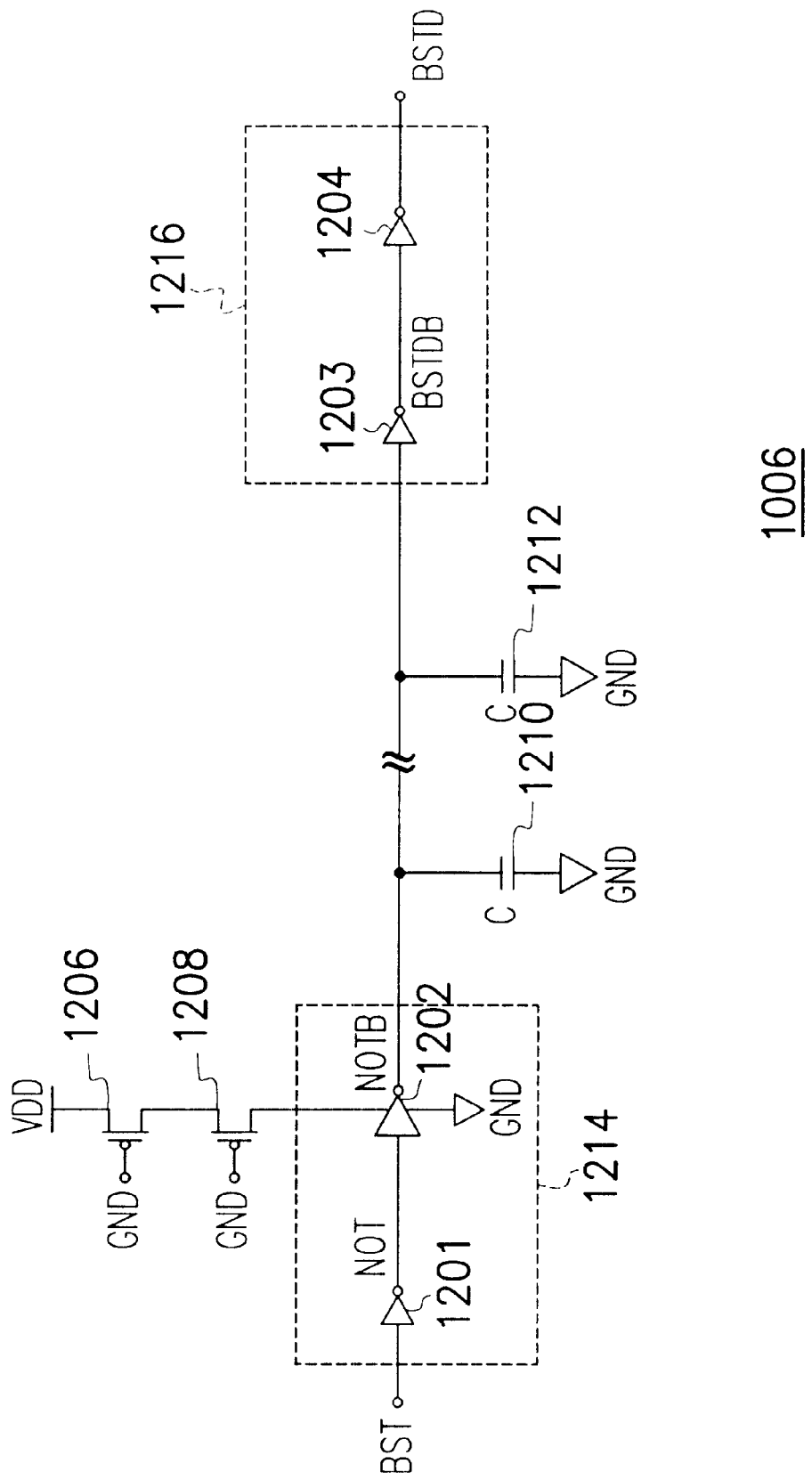
FIG. 12 is a circuit diagram showing a voltage and temperature compensation delay line circuit of a voltage-boosting generator in accordance with a preferred embodiment of the present invention.

FIG. 12 is a circuit diagram showing a voltage and temperature compensation delay line circuit of a voltage-boosting generator in accordance with a preferred embodiment of the present invention. In FIG. 12, an input terminal of an inverter 1201 inside an inverter module 1214 receives an initial-boosting signal BST and produces an inverted signal NOT from its output terminal. A PMOS transistor 1206 (a NMOS transistor may be used) serves as a switch and a source terminal of the PMOS transistor 1206 is coupled to the operating voltage VDD. A control terminal of the PMOS transistor 1206 is connected to the ground. A source terminal of a PMOS transistor 1208 is coupled to a loading terminal of the PMOS transistor 1206. A control terminal of the PMOS transistor 1208 is connected to the ground. The PMOS transistors 1206 and 1208 operate a linear region. A source terminal of an inverter 1202 inside the inverter module 1214 is coupled to the loading terminal of the PMOS transistor 1208. A ground terminal of the inverter 1202 is connected to the ground. An input terminal of the inverter 1202 receives the inverted signal NOT from the inverter 1201. An output terminal of the inverter 1202 transmits out an inverted signal NOTB. An input terminal of an inverter 1203 inside an inverter module 1216 receives the inverted signal NOTB from the inverter 1202. An inverted signal BSTDB is transmitted out from an output terminal of the inverter 1203. An input terminal of an inverter 1204 inside the inverter module 1216 receives the inverted signal BSTDB from the inverter 1203. A delay initial-boosting signal BSTD is transmitted out from an output terminal of the inverter 1204. First terminals of a plurality of capacitors 1210, 1212 are coupled in between the output terminal of the inverter 1202 and the input terminal of the inverter 1203. Second terminals of the capacitors 1210 and 1212 are connected to the ground.

In FIG. 12, the capacitors C may be implemented using MOS transistors. The total number of capacitors C in the circuit depends on the required charge/discharge time of the voltage and temperature compensation delay line circuit 1006. If a longer charge/discharge time is needed, more capacitors C are required. Conversely, fewer capacitors are required if a shorter charge/discharge time is needed. The inverter modules 1214, 1216 also can be used to serve as isolators that prevent external signals from flowing into the capacitors C 1210, C 1212 of the charge/discharge circuit and affecting charging current and charging period. Another factor that affects the time delay of the voltage and temperature compensation delay line circuit 1006 includes the operating voltage VDD and the temperature of a chip. This is because the capacitors C 1210, C 1212 are charged by the inverter 1202 and the operating voltage of the inverter 1202 is VDD. In addition, the PMOS transistors 1206, 1208 operates the linear region and the operating current that flows through the PMOS transistors 1206, 1208 is affected easily by the temperatures changes. Hence, when the temperature of the chip increases, the operating that flows through the PMOS transistors 1206, 1208 is becoming less. In the contrary, when the temperature of the chip decrease, the operating current flowing through the PMOS transistors 1206, 1208 will become big. Hence, any fluctuation of the operating voltage VDD or the chip's temperature changes may lead to a change in charging current and charging period of the capacitor C 1210, C 1212. The voltage and temperature compensation delay line circuit 1006 incorporates an adjusting mechanism such that any variation in the operating voltage VDD or the temperature of the chip leads to a change in charging time of the voltage-boosting circuit 374 (refer to FIG. 10) to the capacitor 376 (as shown in FIG. 10). Consequently, the effects due to a change in the operating voltage VDD or the temperature of the chip are minimized and performance of the voltage-boosting generator 370 (refer to FIG. 3C) is improved.

Figure 13:
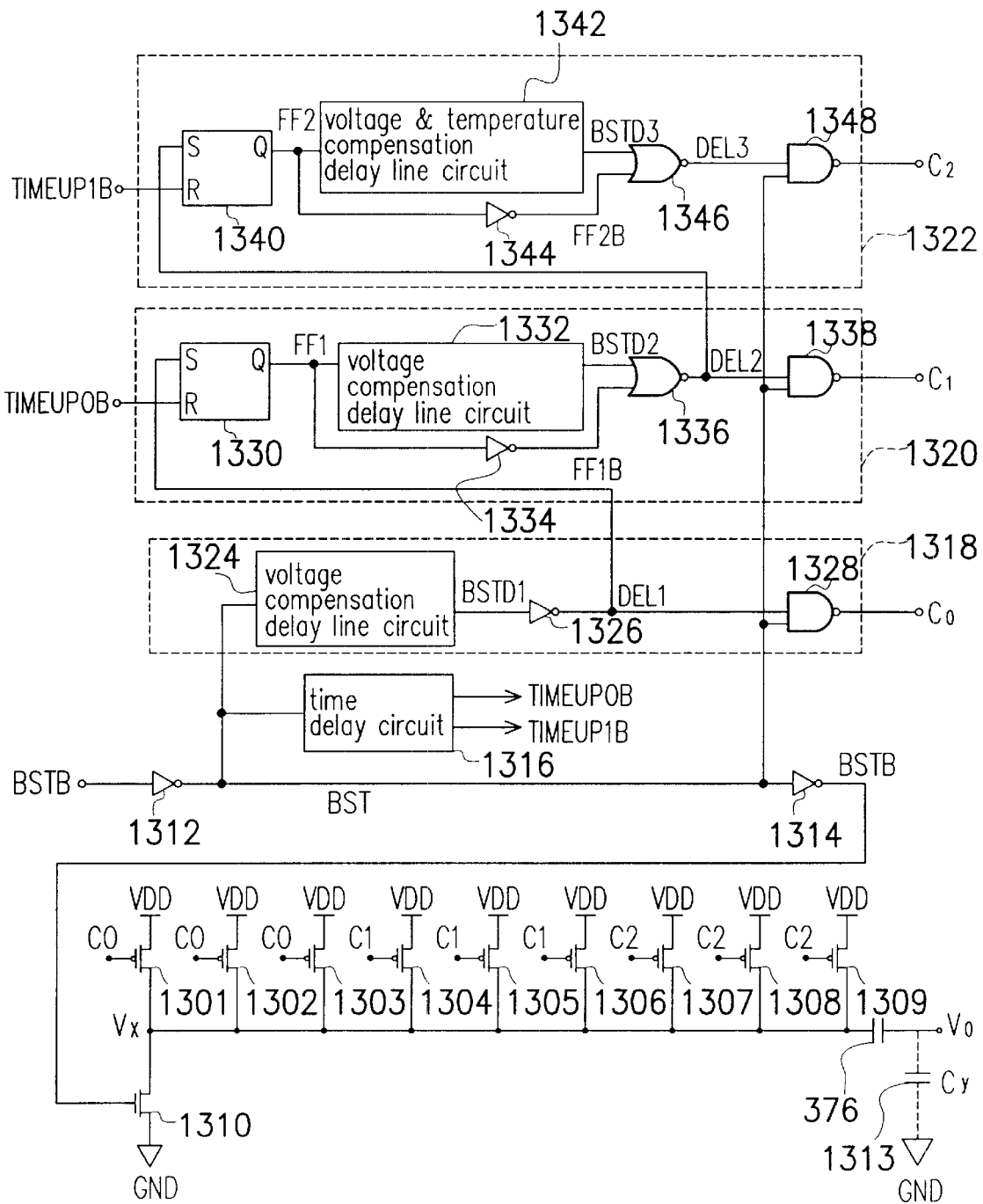
FIG. 13 is another circuit block diagram showing the voltage and temperature compensation of a voltage boosting generator.

FIG. 13 is another circuit block diagram showing the voltage and temperature compensation of a voltage boosting generator. In FIG. 13, an operating time period for an increased voltage of the voltage Vo is decided according to 'H' and 'L' levels of the control signal C0 to control whether voltage-boosting PMOS transistors 301, 302, 303 are in conduct or shut down in order to increase the charging voltage of the capacitor 376 and a parasitic capacitor Cy 1313. According to 'H' and 'L' levels of a control signal C1 to control whether the voltage-boosting PMOS transistors 304, 305, 306 are in conduct or shut down in order to increase the charging voltage of the capacitor 376 and the parasitic capacitor Cy 1313, so that, the an operating period for an increased voltage of voltage Vo can be decided. According to 'H' and 'L' levels of a control signal C2 to control whether the voltage-boosting PMOS transistors 307, 308, 309 are in conduct or shut down in order to increase the charging voltage of the capacitor 376 and the parasitic capacitor Cy 1313, so that, the an operating period for an increased voltage of voltage Vo can be decided. The required number of the above-described voltage-boosting PMOS transistors 1301–1209 (the voltage-boosting circuit 374 shown in FIG. 3) is depended according to the flowing size of the charging current and the charging period. However, the required number is not fixed but rather various. The voltage-boosting PMOS transistors can be implemented using NMOS transistors.

Reset NMOS transistor 1310 (the NMOS transistors are used as an example in the embodiments of the invention, however, PMOS transistors can be implemented) resets voltage transmitted from the reset voltage-boosting PMOS transistors 1310–1309 at the voltage Vo in accordance with the received inverted initial-boosting signal BSTB. An input terminal of an inverter 1312 receives the inverted initial-boosting signal BSTB and produces an initial-boosting signal BST from its output terminal. An input terminal of an inverter 1314 receives the initial-boosting signal BST and produces an inverted initial-boosting signal BSTB from its output terminal.

A time delay circuit 1316 performs a time delay on the received initial-boosting signal BST and produces an initial time signal TIMEUP0B and another initial time signal TIMEUP1B. The difference between the initial time signals TIMEUP0B, TIMEUP1B and the initial-boosting signal BST is the different periods of time delay.

A delay line logic circuit 1318 (includes the delay line circuit 372 shown in FIG. 3) has a function for altering the compensation operating voltage. The delay line logic circuit 1318 performs a time delay and logic judgement on the initial-boosting signal BST in order to produce a delay signal DEL 1 and a control signal C0. A delay line logic circuit 1320 (includes the delay line circuit 372 shown in FIG. 3) consists a function for altering the compensation operating voltage. The delay line logic circuit 1320 performs a time delay and logic judgement on the initial-boosting signal BST, delay signal DEL1 and the initial time signal TIMEUP0B in order to produce a delay signal DEL 2 and a control signal C1. A delay line logic circuit 1322 (includes the delay line circuit 372 shown in FIG. 3) consists a function for altering the compensation operating voltage and the temperature of the chip. The delay line logic circuit 1322 performs a time delay and logic judgement on the initial-boosting signal BST, delay signal DEL2 and the initial time signal TIMEUP1B in order to produce a control signal C2.

In FIG. 13, the delay line logic circuit 1318 further comprises a voltage compensation delay line circuit 1324, an inverter 1326 and a NAND gate 1328. The voltage compensation delay line circuit 1324 performs a time delay on the initial-boosting signal BST to produce a delay initial-boosting signal BSTD1. An input terminal of the inverter 1326 receives the initial-boosting signal BSTD1 from the voltage compensation delay line circuit 1324. A delay signal DEL1 is transmitted out from an output terminal of the inverter 1326. The NAND gate 1328 performs a NAND operation according to the initial-boosting signal BST and the delay signal DEL1 in order to produce a control signal C0.

The delay line logic circuit 1322 in FIG. 13 further includes an RS flip-flop 1340, a voltage and temperature compensation delay line circuit 1342, an inverter 1344, a NOR gate 1346 and a NAND gate 1348. A S terminal of the RS flip-flop 1340 receives a delay signal DEL2 and a R terminal of a RS flip-flop 1340 receives an initial timing signal TIMEUP1B. According to the initial timing signal TIMEUP1B and the delay signal DEL2, the RS flip-flop 1340 produces a flip-flop signal FF2. The voltage and temperature compensation delay line circuit 1342 performs a time delay on the flip-flop signal FF2 from the RS flip-flop 1340 and produces a delay initial-boosting signal BSTD3. An input terminal of the inverter 1344 receives the flip-flop signal FF2 from the RS flip-flop 1340 and outputs an inverted signal FF2B. The NOR gate 1346 performs a NOR gate operation to produce a delay signal DEL3 according to the delay initial-boosting signal BSTD3 from the voltage and temperature compensation delay line circuit 1342 and the inverted signal FF2B from the inverter 1344. Similarly, the NAND gate 1348 performs a NAND gate operation to produce a control signal C2 according to the initial-boosting signal BST and the delay signal DEL3 from the NOR gate 1346.

Figure 14:
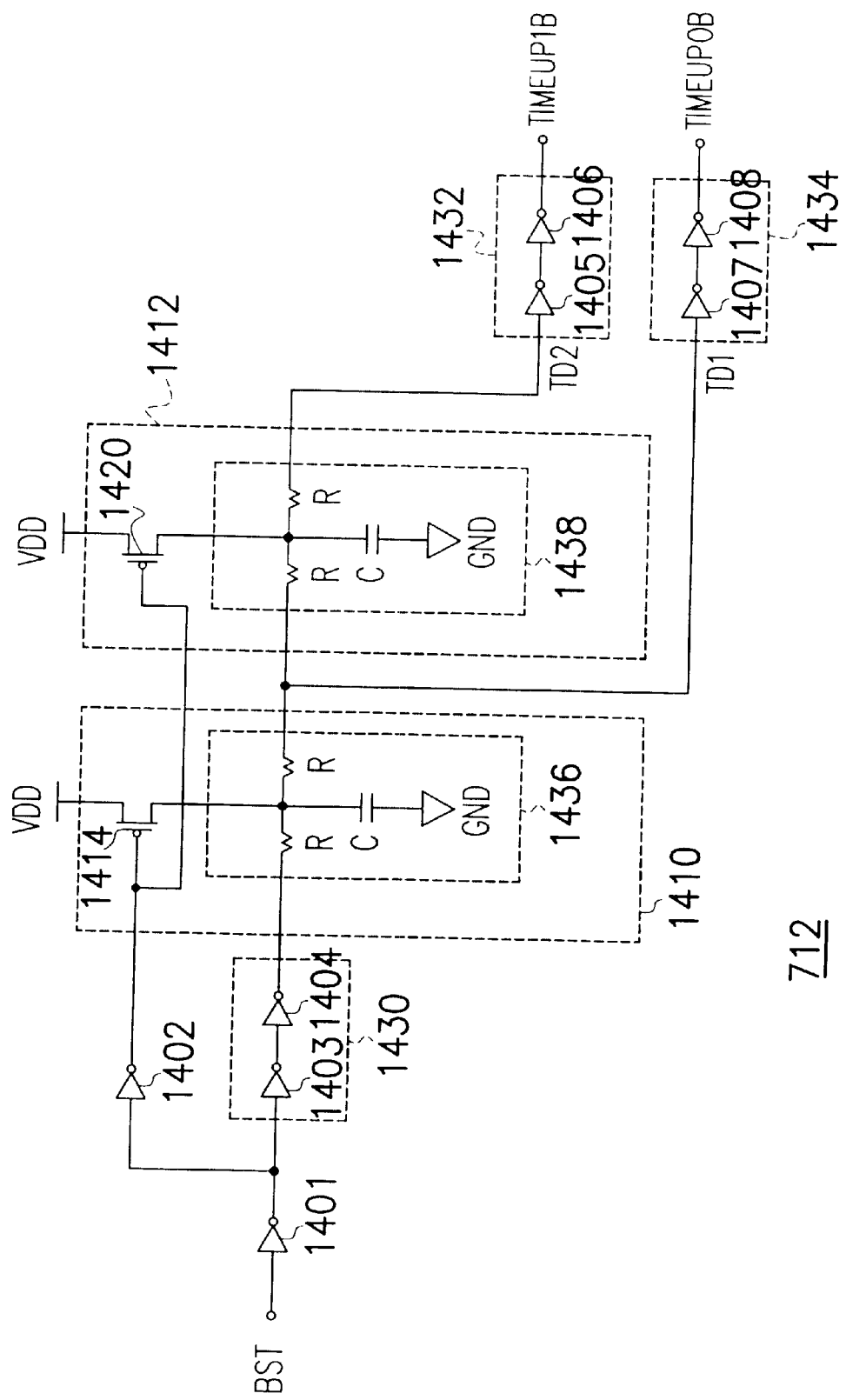
FIG. 14 is a circuit diagram showing a timing delay circuit of a voltage-boosting generator in accordance with another preferred embodiment of the present invention.

FIG. 14 is a circuit diagram showing a timing delay circuit of a voltage-boosting generator in accordance with another preferred embodiment of the present invention. In FIG. 14, an input terminal of an inverter 1401 of the time delay circuit 712 receives the initial-boosting signal BST and produces a first inverted signal from its output terminal. An input terminal of an inverter 1402 receives the first inverted signal from the inverter 1401 and produces a second inverted signal from its output terminal. An input terminal of an inverter 1403 of the inverter module 1430 receives the first inverted signal from the inverter 1402. An output terminal of the inverter 1403 transmits out a third inverted signal. An input terminal of an inverter 1404 of the inverter module 1430 receives the third inverted signal from the inverter 1403 and produces a fourth inverted signal from its output terminal.

A source terminal of the time delay circuit 1410 is coupled to the operating voltage VDD. A first signal input terminal of the time delay circuit 1410 receives the second inverted signal from the inverter 1402. A second signal input terminal of the time delay circuit 1410 receives the fourth inverted signal from the inverter 1404. The time delay circuit 1410 performs a time delay and produces a time delay signal TD 1, which is then transmitted out by a time delay signal output terminal. A source terminal of the time delay circuit 1412 is coupled to the operating voltage VDD. A first signal input terminal of the time delay circuit 1412 receives the second inverted signal from the inverter 1402. A second signal input terminal of the time delay circuit 1412 receives the time delay signal TD1 from the time delay circuit 1410. The time delay circuit 1412 performs a time delay and produces a time delay signal TD 2, which is then transmitted out by a time delay signal output terminal.

An input terminal of an inverter 1407 of an inverter module 1434 receives the time delay signal TD1 from the time delay circuit 1410 and produces a fifth inverted signal from its output terminal. An input terminal of an inverter 1408 of the inverter module 1434 receives the fifth inverted signal from the time delay circuit 1407 and produces an initial time signal TIMEUP0B from its output terminal. An input terminal of an inverter 1405 of the inverter module 1434 receives the time delay signal TD2 from the time delay circuit 1412 and produces a seventh inverted signal from its output terminal. An input terminal of an inverter 1406 of the inverter module 1434 receives the seventh inverted signal from the time delay circuit 1405 and produces an initial time signal TIMEUP1B from its output terminal.

In FIG. 14, according to a charge/discharge duty cycle of the initial time signal TIMEUP0B, a plurality of sets of the time delay circuits, which are identical to the time delay circuit 1410 may be used to adjust the duty cycle. Similarly, according to a charge/discharge duty cycle of the initial time signal TIMEUP1B, a plurality of sets of the time delay circuits, which are identical to the time delay circuit 1412 may be used to adjust the duty cycle.

In FIG. 14, a PMOS transistor 1414 (a NMOS transistor may be used) within the time delay circuit 1410 serves as a switch. A source terminal of the PMOS transistor 1414 is coupled to the operating voltage terminal VDD. A control terminal of the PMOS transistor 1414 is coupled to the output terminal of the inverter 1402. A loading terminal of the PMOS transistor 1414 serves as a charging source for a RC circuit 1436. The RC circuit 1436 delays the fourth inverted signal from the inverter 1404 for a period of time before sending out the time delay signal TD1 to the input terminal of the inverter 1407. The circuit structure of the RC circuit 1436 can be implemented in many ways, such as the RC circuit 1436 shown in FIG. 14 is just one type of many circuit structures. Similarly, a PMOS transistor 1420 (a NMOS transistor may be used) within the time delay circuit 1412 serves as a switch. A source terminal of the PMOS transistor 1430 is coupled to the operating voltage terminal VDD. A control terminal of the PMOS transistor 1420 is coupled to the output terminal of the inverter 1402. A loading terminal of the PMOS transistor 1420 serves as a charging source for a RC circuit 1438. The RC circuit 1438 delays the time delay signal TD1 from the inverter 1410 for a period of time before sending out the time delay signal TD2 to the input terminal of the inverter 1405. Amongst, capacitors C inside the RC circuits 1436, 1438 can be implemented by using MOS transistors. The resistor R of the RC circuits 1436, 1438 can be implemented by using low temperature coefficient resistors (such as poly R). Hence, when the RC circuits are charged or discharged, the flowing size of the charging/discharging current and the charging/discharging period are less affected by the temperature changes. Furthermore, reasons for using inverters 1410, 1434 within the time delay circuit 712 aside from the capacity of charging/discharging the RC circuits to a fixed level-switching voltage in order to perform switching 'H' and 'L' level operation is that the RC circuits are effectively isolated. So that, an external signal is incapable to reach the RC circuits and affect the flowing size of charging/discharging current and charging/discharging period.

The detailed circuit structures of the voltage compensation delay line circuits 1324 and 1332 in FIG. 13 are the same as the one shown in FIG. 6. The differences between of the voltage compensation delay line circuit 1324 and the voltage compensation delay line circuit 1332 are input and output signals. An input signal of the voltage compensation delay line circuit 1324 is an initial-boosting signal BST and an output signal is a delay signal BSTD1. An input signal of the voltage compensation delay line circuit 1332 is a signal FF1 and an output signal is a delay signal BSTD2. Although, the input signal and the output signal of the voltage compensation delay line circuit 1324 are different from the voltage compensation delay line circuit 1332. However, the detailed circuit structures of these two voltage compensation delay line circuits 1324 and 1332 are the same as the one shown in FIG. 6. The detailed circuit structure of the voltage compensation delay line circuit 1342 in FIG. 13 are the same as the one shown in FIG. 12. The differences between of the voltage compensation delay line circuit 1342 and the voltage compensation delay line circuit 1006 are input and output signals. An input signal of the voltage compensation delay line circuit 1342 is a signal FF2 and an output signal is a delay signal BSTD3. Although, the input signal and the output signal of the voltage compensation delay line circuit 1342 are different from the one shown in FIG. 12. However, the detailed circuit structure of the voltage compensation delay line circuit 1342 is the same as the one shown in FIG. 12.

Figure 15:
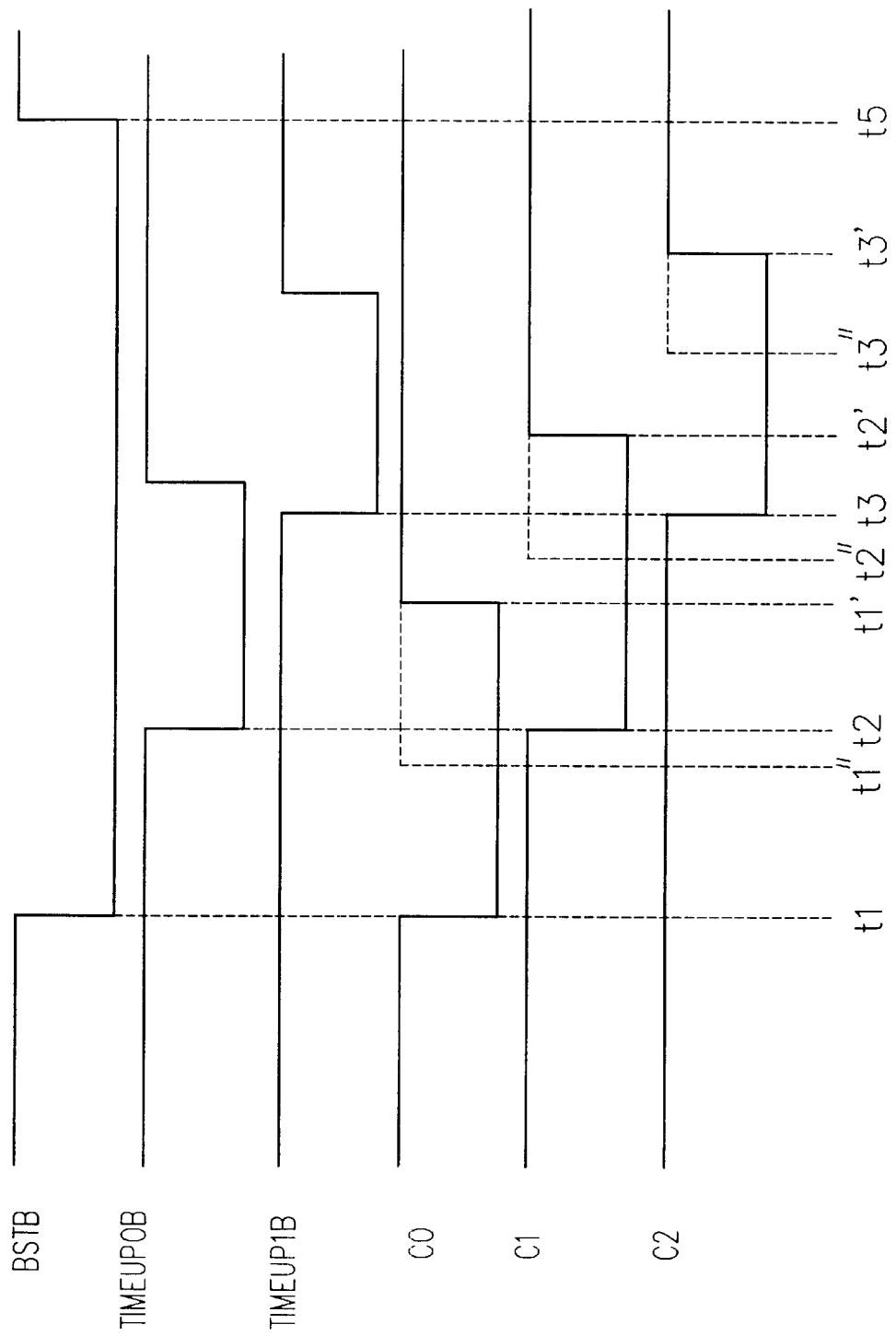
FIG. 15 is a timing diagram of the control signals of the circuit in FIG. 13.

FIG. 15 is a timing diagram of the control signals of the circuit in FIG. 13. In FIG. 15, considering that the chip has a normal operating voltage range 2.6V~3.7V and a normal operating temperature range −40° C.~85° C. Extreme operating voltage 2.6V and operating temperature 85° C. can be defined as a low corner point and extreme operating voltage 3.7V and operating temperature −40° C. can be defined as a high corner point. The following is an explanation of the circuit shown in FIG. 13 operating at the low corner point condition (an operating voltage 2.6V and an operating temperature 85C). At time point t1, the changing of signal BSTB from 'H' to 'L' indicates the initial-boosting signal BST changes from 'L' to 'H'. The time delay circuit 1316 and the delay line logic circuit 1318 starts to operate. The delay line logic circuit 1318 also changes the control signal C0 from 'H' to 'L' at time point t1 so that PMOS transistors 1301~1303 are in conduct and the voltage at the output terminal Vo is increased.

At a time point t2, since the control signal C0 is still in the 'L' state, after a period of time, the delay line logic circuit 1320 starts to alter the initial timing signal TIMEUP0B from 'H' to 'L' and transfer the signal to the delay line logic circuit 1320. At this moment, the delay line logic circuit 1318 sends out a delay signal DEL1 at 'H' to the delay line logic circuit 1320. As soon as the delay line logic circuit 1320 receives the initial timing signal TIMEUP0B at 'L' and the delay signal DEL1 at 'H', the delay line logic circuit 1320 starts to operate. Similarly, at the time point t2, the control signal C1 changes from 'H' to 'L' so that the PMOS transistors 1304~1306 are in conduct, further boosting the voltage at the output terminal Vo.

At a time point t3, since the control signal C1 is still in the 'L' state, the initial timing signal TIMEUP1B of the delay line circuit 1316 changes from 'H' to 'L' and transfers the signal to the delay line logic circuit 1322. At this moment, the delay line logic circuit 1320 submits a delay signal DEL2 at 'H' to the delay line logic circuit 1320. The delay line logic circuit 1322 starts to operate as soon the delay line logic circuit receives the initial timing signal TIMEUP1B at 'L' and the delay signal DEL2 at 'H'. Similarly at the time point t3, the control signal C2 changes from 'H' to 'L' so that the PMOS transistors 1307~1309 are in conduct, again boosting the voltage at the output terminal Vo.

When the voltage-boosting generator 370 has attained a pre-defined voltage level at time point t4, the signal BSTB changes from 'L' to 'H'. In other words, the initial-boosting signal BST changes from 'H' to 'L'. At this time, the time delay circuit 1316, the delay line logic circuit 1318, the delay line logic circuit 1320 and the delay line logic circuit 1322 stop working and all control signals C0, C1 and C2 are at 'H'.

If the voltage-boosting generator 370 operates in a high corner point condition (operating voltage at 3.7V and operating temperature at −40° C.), a charging period is shortened due to considerable increase in internal charging current inside the delay line logic circuit 1318, the delay line logic circuit 1320 and the delay line logic circuit 1322. As shown in FIG. 15, a timing position of the control signal C0 changed from 'L' to 'H' shifts from t1' to t1". At this time, the initial time signal TIMEUP0B is still at 'H' indicates that the voltage at the terminal Vo has already reached the required voltage value for the operation. Hence, the signal BSTB will change from 'L' to 'H' at time t5 while the control signal C1, the control signal C2, the initial time signal TIMEUP0B and the initial time signal TIMEUP1B will not transit from 'H' to 'L'.

If the transition of the control signal C0 from 'L' to 'H' occurs between the time interval t2 and t1' and the initial time signal TIMEUP0B transits from 'H' to 'L' at the time point t2, the control signal C1 also transits from 'H' to 'L' at the time point t2. The time position of the control signal C1 changed from 'L' to 'H' shifts from t2' to t2". At this time, the initial time signal TIMEUP1B is still at 'H' indicates that the voltage at the terminal Vo has already reached a required voltage level for operation. The initial time signal TIMEUP1B is still at the time point t3 and changes from 'H' to 'L'. The control signal C2 will decide whether altering the level from 'H' to 'L' in accordance with statuses of the initial time signal TIMEUP1B and the control signal C1.

If the transition of the control signal C1 from 'L' to 'H' occurs at an interval between the time points t3 and t2' and the initial timing signal TIMEUP1B transits from 'H' to 'L' at the time point t3, the control signal C2 transits from 'H' to 'L' at the time point t2. The timing position for the transition of the control signal C2 from 'L' to 'H' shifts from t3 to t3'. Hence, time spent by the voltage boosting generator 370 to boost output voltage to a required level is shortened. At a time point t4, the signal BSTB transits from 'L' to 'H' so that the NMOS transistor 1310 (refer to FIG. 13) resets voltage at the terminal Vo. However, the voltage-boosting generator 370 mostly operates at an operating voltage between 2.6V~3.7V and an operating temperature between −40° C.~85° C. Therefore, the timing position of the transition of the control signal C0 from 'L' to 'H' shifts from t1' to t1" and other signals follow similarly.

Figure 16:
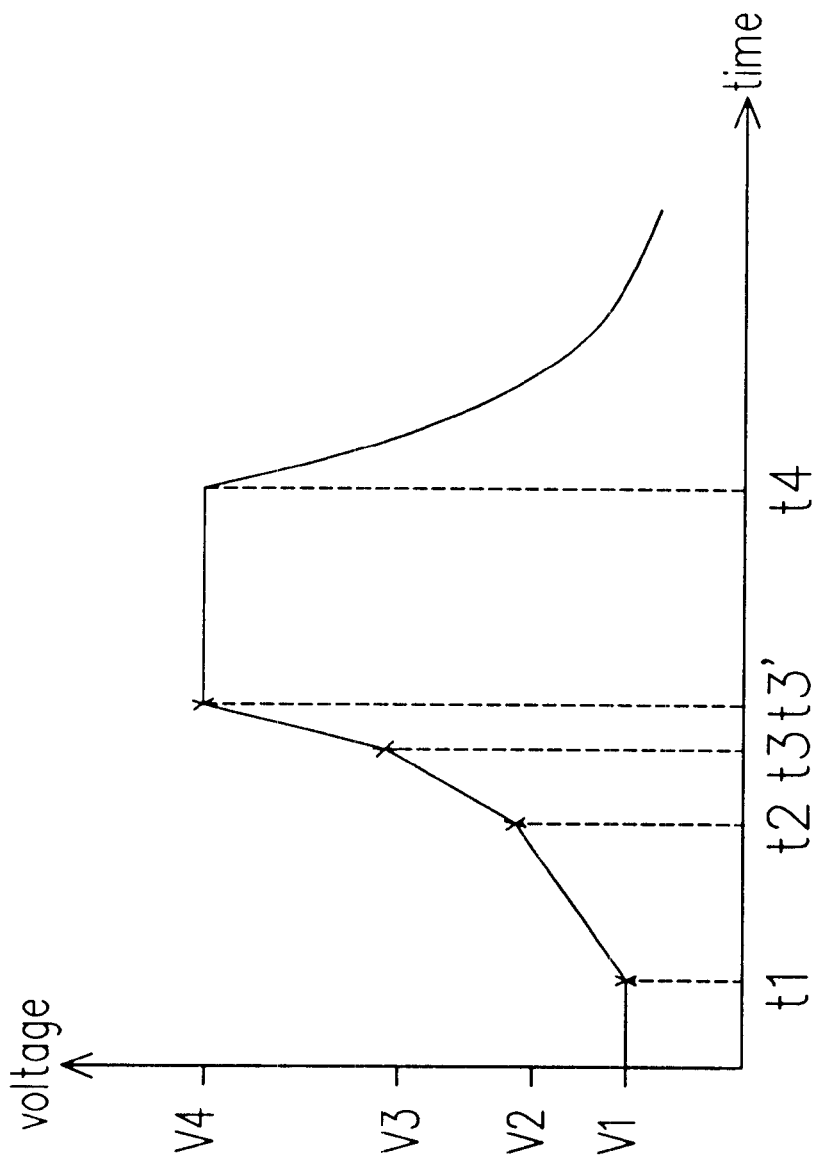
FIG. 16 is a graph diagram showing a working curve of the voltage-boosting generator in FIG. 13.

FIG. 16 is a graph diagram showing a working curve of the voltage-boosting generator in FIG. 13 and the following description also refers to the timing diagram in FIG. 15 and the circuit diagram in FIG. 13. When the signal BSTB changes from 'H' to 'L' at the time point t1, the control signal C0 changes from 'H' to 'L'. The voltage-boosting generator 370 drives the voltage at the output terminal Vo up from V1. At the time point t2, the control signal C1 transits from 'H' to 'L' increasing the voltage at the output terminal Vo up from V2. At the time point t3, the control signal C2 transits from 'H' to 'L' increasing the voltage at the output terminal Vo up from V3. At the time point t3', the control signal C0, the control signal C1 and the control signal C2 all are at 'H' indicating the voltage-boosting generator 370 has driven the voltage at the output terminal Vo to a required level V4 for the operation. At the time point t4, the signal BSTB transits from 'L' to 'H' so that the NMOS transistor 1310 conducts and discharges the boosting capacitor Cx 376 and the parasitic capacitor Cy 1313. Hence, the voltage at the terminal Vo starts to drop from V4.

In this invention, two different types of delay line circuits are designed to cater to operating voltage variation and temperature change of a die. The first type of delay circuit has the capacity to modify the charging period and the number of conductive MOS transistors used in the voltage-boosting operation to counteract the operating voltage variation. The second type of delay circuit has the capacity to modify the charging period and the number of conductive MOS transistors used in the voltage-boosting operation to counteract the operating voltage variation as well as temperature change. Ultimately, the voltage-boosting generator is able to provide a voltage at the pre-defined level unaffected by operating voltage variation and temperature change. In addition, even if the die operates at a lower corner point condition, the plurality of delay line circuits within the voltage-boosting generator can be adjusted to provide the desired operating characteristics by resetting the charging period and the number of conductive MOS transistors.

In conclusion, the invention is able to reduce boosting voltage errors resulting from operating voltage variation and temperature change in the die. Another advantage of this invention is the strong self-rectifying capacity when a die works at the lower corner point condition.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A voltage-boosting generator for reducing effects due to operating voltage variation and temperature change, comprising:
   a delay circuit for performing a time delay according to an initial boosting signal and producing a control signal; and
   a voltage boosting circuit for boosting voltage according to the control signal, wherein the voltage boosting circuit comprises a plurality of MOS and a reset MOS for resetting voltage.

2. The voltage-boosting generator of claim 1, further comprising a capacitor coupled to the voltage boosting circuit.

3. A voltage-boosting generator for reducing effects due to operating voltage variation and temperature change, comprising:
   a delay circuit for performing a time delay according to an initial boosting signal and producing a control signal, wherein the delay circuit includes a delay logic circuit for compensating the operating voltage variation, and performing a time delay and determining the logic according to the initial boosting signal, so as to produce the control signal; and
   a voltage boosting circuit for boosting voltage according to the control signal.

4. The voltage-boosting generator of claim 3, wherein the delay logic circuit further comprising:
   a first voltage compensation delay circuit for performing a time delay for the initial boosting signal so as to produce a first delay initial driving signal;
   a first inverter for inverting the first delay initial driving signal so as to output a first delay signal; and
   a first NAND gate for performing a NAND gate operation according to the initial boosting signal and the first delay signal, so as to output a first control signal to the voltage boosting circuit.

5. The voltage-boosting generator of claim 4, wherein the first voltage compensation delay circuit further comprising:
   a first inverter module for inverting the initial boosting signal, so as to output a first inverting signal;
   a first switch MOS having a source terminal coupled to an operating voltage, a control terminal coupled to the source terminal, and a loading terminal for providing power to the first inverter module;
   a second inverter module for inverting the first inverting signal, so as to output the first delay initial driving signal; and
   a first capacitor having a first terminal coupled between an output terminal of the first inverter module and an input terminal of the second inverter module, and a second terminal coupled to a ground.

6. A voltage-boosting generator for reducing effects due to operating voltage variation and temperature change, comprising:
   a delay circuit for performing a time delay according to an initial boosting signal and producing a control signal, wherein the delay circuit includes a delay logic circuit for compensating the operating voltage variation and the temperature change, and performing a time delay and determining the logic according to the initial boosting signal, so as to produce the control signal; and
   a voltage boosting circuit for boosting voltage according to the control signal.

7. The voltage-boosting generator of claim 6, wherein the delay logic circuit further comprising:
   a first inverter for inverting the initial boosting signal, so as to output a first inverting signal;
   a voltage and temperature compensation delay circuit for performing a time delay for the first inverting signal, so as to produce a delay signal;
   a second inverter for inverting the delay initial driving signal, so as to output an inverting delay signal; and
   a NAND gate for performing a NAND gate operation according to the first inverting signal and the inverting delay signal, so as to output the control signal.

8. The voltage-boosting generator of claim 7, wherein the voltage and temperature compensation delay circuit further comprising:
   a first inverter module for inverting the first inverting signal, so as to output a second inverting signal;
   a first switch MOS having a source terminal coupled to an operating voltage, and a control terminal coupled to a ground;
   a second switch MOS having a source terminal coupled to a loading terminal of the first switch MOS, a control terminal coupled to a ground, and a load terminal of the second swtich MOS supplies power to the first inverter module;
   a second inverter module for inverting the second inverting signal, so as to output the delay signal; and
   a capacitor having a first terminal coupled between an output of the first inverting module and an input of the second inverting module, and a second terminal coupled to a ground.

9. A voltage-boosting generator for reducing effects due to operating voltage variation and temperature change, comprising:
   a delay circuit for performing a time delay according to an initial boosting signal and producing a control signal; and
   a voltage boosting circuit for boosting voltage according to the control signal;
   wherein the delay circuit comprises:
      a delay line circuit for performing a time delay for the initial boosting signal, so as to produce an initial time signal;
      a first delay logic circuit for compensating the operating voltage variation, and performing a time delay and determining the logic from the initial boosting signal, so as to produce a first delay signal and a first control signal; and
      a second delay logic circuit for compensating the operating voltage variation and temperature change, and performing a time delay and determining the logic from the first delay signal, the initial time signal, and the initial boosting signal, so as to produce a second control signal;

wherein the voltage boosting circuit boosts the voltage according to the first control signal and the second control signal.

10. The voltage-boosting generator of claim 9, wherein the first delay logic circuit further comprising:
a time delay circuit for performing a time delay for the initial boosting signal, so as to produce an initial time signal; and
a third delay logic circuit for compensating the operating voltage variation, and performing a time delay and determining the logic from the initial time signal and the first delay initial boosting signal, so as to produce a third control signal.

11. The voltage-boosting generator of claim 10, wherein the third delay logic circuit further comprising:
a first RS flip-flop for producing a first flip-flop signal according to the initial time signal and the first delay signal;
a second voltage compensation delay circuit for performing a time delay for the first flip-flop signal, so as to produce a second delay initial driving signal;
a second inverter for inverting the first flip-flop signal, so as to output a third inverting signal;
a first NOR gate for performing a NOR gate operation according to the second delay initial driving signal and the third inverting signal, so as to output a second delay signal; and
a second NAND gate for performing a NAND gate operation according to the initial boosting signal and the second delay signal, so as to output a second control signal to the voltage boosting circuit.

12. The voltage-boosting generator of claim 11, wherein the second voltage compensation delay circuit further comprising:
a third inverter module for inverting the first flip-flop signal, so as to output a fourth inverting signal;
a second switch MOS having a source terminal coupled to an operating voltage, a control terminal coupled to the source terminal, and a loading terminal for providing power to the third inverter module;
a fourth inverter module for inverting the fourth inverting signal, so as to output the second delay initial driving signal; and
a second capacitor having a first terminal coupled between an output terminal of the third inverter module and an input terminal of the fourth inverter module, and a second terminal is coupled to a ground.

13. The voltage-boosting generator of claim 9, wherein the delay line circuit further comprising:
a first inverter for inverting the initial boosting signal, so as to output a first inverting signal;
a second inverter for inverting the first inverting signal, so as to output a second inverting signal;
a first inverter module for inverting the first inverting signal, so as to output a third inverting signal;
a RC time delay circuit for producing a RC time delay signal after a time delay is performed according to the second and third inverting signals; and
a second inverter module for inverting the RC time delay signal, so as to output the initial time signal.

14. The voltage-boosting generator of claim 13, wherein the RC time delay circuit further comprising:

a switch MOS having a source terminal coupled to an operating voltage, a control terminal coupled to an output terminal of the second inverter; and
a RC circuit is charged from a loading terminal of the switch MOS, wherein the RC circuit outputs the RC time delay signal to the second inverter module after the RC circuit performs a time delay for the third inverting signal.

15. A voltage-boosting generator for reducing effects due to operating voltage variation and temperature change, comprising:
a delay circuit for performing a time delay according to an initial boosting signal and producing a control signal; and
a voltage boosting circuit for boosting voltage according to the control signal, wherein the voltage boosting circuit comprises:
a first voltage boosting circuit for determining a time segment for the voltage boosting operation according to a first control signal;
a second voltage boosting circuit for determining a time segment for the voltage boosting operation according to a second control signal; and
a third voltage boosting circuit for determining a time segment for the voltage boosting operation according to a third control signal; and
a reset MOS for resetting voltage output from the first voltage boosting circuit, the second voltage boosting circuit, and the third voltage boosting circuit according to the initial boosting signal.

16. A voltage-boosting generator for reducing effects due to operating voltage variation and temperature change, comprising:
a delay circuit for performing a time delay according to an initial boosting signal and producing a control signal; and
a voltage boosting circuit for boosting voltage according to the control signal;
wherein the delay circuit comprises:
a delay line circuit for performing a time delay for the initial boosting signal so as to produce a first initial time signal and a second initial time signal;
a first delay logic circuit for compensating the operating voltage variation, performing a time delay and determining a logic of the initial boosting signal, so as to produce the first delay signal and the first control signal;
a second delay logic circuit for compensating the operating voltage variation, performing a time delay and determining a logic of the first delay signal, the first initial time signal, and the initial boosting signal, so as to produce the second control signal;
a third delay logic circuit for compensating the operating voltage variation and temperature change, and performing a time delay and determining a logic of the second delay signal, the second initial time signal, and the initial boosting signal, so as to produce the third control signal.

17. The voltage-boosting generator of claim 16, wherein the delay line circuit further comprising:
a first inverter for inverting the initial boosting signal so as to produce a first inverting signal;
a second inverter for inverting the first inverting signal so as to output a second inverting signal;
a first inverting module for inverting the first inverting signal so as to output a third inverting signal;

a first RC time delay circuit for producing a first RC time delay signal after a time delay is performed according to the second and third inverting signals;

a second RC time delay circuit for producing a second RC time delay signal after a time delay is performed according to the first and second inverting signals;

a second inverter module for inverting the first RC delay signal so as to output the initial time signal; and a third inverter for inverting the second RC delay signal so as to output the second initial time signal.

18. The voltage-boosting generator of claim 17, wherein the first RC time delay circuit further comprising:

a first switch MOS having a source terminal coupled to an operating voltage, a control terminal coupled to the second inverter; and a first RC circuit is charged from a loading terminal of the switch MOS, wherein the RC circuit outputs the first RC time delay signal to the second inverter module after the RC circuit performs a time delay for the third inverting signal.

19. The voltage-boosting generator of claim 17, wherein the second RC time delay circuit further comprising:

a second switch MOS having a source terminal coupled to an operating voltage, a control terminal coupled to the second inverter; and a second RC circuit is charged from a loading terminal of the switch MOS, wherein the RC circuit outputs the second RC time delay signal to the second inverter module after the RC circuit performs a time delay for the first inverting signal.

20. The voltage-boosting generator of claim 16, wherein the first delay logic circuit further comprising:

a first voltage compensation delay circuit for performing a time delay for the initial boosting signal so as to produce a first delay initial driving signal;

a first inverter for inverting the first delay initial driving signal so as to output the first delay signal; and a first NAND gate for performing a NAND gate operation according to the initial boosting signal and the first delay signal, so as to output the first control signal to the voltage boosting circuit.

21. The voltage-boosting generator of claim 20, wherein the first voltage compensation delay circuit further comprising:

a first inverter module for inverting the initial boosting signal, so as to output a second inverting signal;

a first switch MOS having a source terminal coupled to an operating voltage, a control terminal coupled to the source terminal, and a loading terminal for providing power to the first inverter module;

a second inverter module for inverting the second inverting signal, so as to output a first delay initial driving signal; and a first capacitor having a first terminal coupled between an output terminal of the first inverter module and an input terminal of the second inverter module, and a second terminal coupled to a ground.

22. The voltage-boosting generator of claim 16, wherein the second delay logic circuit further comprising:

a first RS flip-flop for producing a first flip-flop signal according to the initial time signal and the first delay signal;

a second voltage compensation delay circuit for performing a time delay for the first flip-flop signal so as to produce a second delay initial driving signal;

a second inverter for inverting the first flip-flop signal to produce a third inverting signal;

a first NOR gate for performing a NOR gate operation according to the second initial driving signal and the third inverting signal, so as to output the second delay signal; and a second NAND gate for performing a NAND gate operation according to the initial boosting signal and the second delay signal, so as to output the second control signal.

23. The voltage-boosting generator of claim 22, wherein the second voltage compensation delay circuit further comprising:

a third inverting module for inverting the first flip-flop signal to output a fourth inverting signal;

a second switch MOS having a source terminal coupled to an operating voltage, a control terminal coupled to the source terminal, and a loading terminal for providing power to the third inverting module;

a fourth inverting module for inverting the fourth inverting signal to output a second delay initial driving signal; and a second capacitor having a first terminal coupled between an output of the third inverting module and an input of the fourth inverting module, and a second terminal is coupled to a ground.

24. The voltage-boosting generator of claim 16, wherein the third delay logic circuit further comprising:

a second RS flip-flop for producing a second flip-flop signal according to the second initial time signal and the second delay signal;

a voltage and temperature compensation delay circuit for performing a time delay for the second flip-flop signal, so as to produce a third delay initial driving signal;

a third inverter for inverting the second flip-flop signal to output a fifth inverting signal;

a second NOR gate for performing a NOR gate operation according to the third delay initial driving signal and the fifth inverting signal, so as to output a third delay signal; and a third NAND gate for performing a NAND gate operation according to the initial boosting signal and the third delay signal, so as to output the third control signal.

25. The voltage-boosting generator of claim 24, wherein the voltage and temperature compensation delay circuit further comprising:

a fifth inverting module for inverting the second flip-flop signal to output a sixth inverting signal;

a third switch MOS having a source terminal coupled to an operating voltage, a control terminal coupled to a ground;

a fourth switch MOS having a source terminal coupled to the loading terminal of the third switch MOS, a control terminal coupled to a ground, and a loading terminal for providing power to the fifth inverting module;

a sixth inverting module for inverting the sixth inverting signal to output a third delay initial driving signal; and a third capacitor having a first terminal coupled between an output terminal of the fifth inverting module and an input terminal of the sixth inverting module, and a second terminal coupled to a ground.

* * * * *